United States Patent [19]

Haupt

[11] Patent Number: 4,642,645

[45] Date of Patent: Feb. 10, 1987

[54] REDUCING GRATING LOBES DUE TO SUBARRAY AMPLITUDE TAPERING

[75] Inventor: Randy L. Haupt, Ann Arbor, Mich.

[73] Assignee: The United States of America as represented by the Secretary of the Air Force, Washington, D.C.

[21] Appl. No.: 731,646

[22] Filed: May 7, 1985

[51] Int. Cl.[4] ........................... G01S 3/16; H01Q 3/22

[52] U.S. Cl. ..................................... 342/379; 342/371

[58] Field of Search ............... 343/371, 368, 379, 375, 343/380, 383

[56] References Cited

U.S. PATENT DOCUMENTS

| | | | |
|---|---|---|---|
| 3,270,336 | 8/1966 | Birge | 343/5 |
| 3,877,031 | 4/1975 | Mailloux et al. | 343/778 |
| 4,045,800 | 8/1977 | Tang et al. | 343/854 |
| 4,246,585 | 1/1981 | Mailloux | 343/854 |
| 4,338,605 | 7/1982 | Mims | 343/100 LE |

*Primary Examiner*—Theodore M. Blum
*Assistant Examiner*—Gregory C. Issing
*Attorney, Agent, or Firm*—William G. Auton; Donald J. Singer

[57] ABSTRACT

Subarray amplitude tapering is a simple, lower cost method of generating low sidelobes in an antenna's far field pattern. Unfortunately, this simple technique also generates unwanted grating lobes. Placing the exact amplitude taper at the element outputs produces the desired far field pattern, but the architecture is complicated and expensive. An alternative to these two techniques is a design process that entails placing amplitude tapering at subarray outputs and element amplitude tapers that are identical between corresponding elements in groups of identical subarrays. In this way, the amplitude taper approximates the desired taper much better than subarray tapering alone, yet groups of subarrays are identical so that the design remains very simple.

11 Claims, 38 Drawing Figures

REDUCING GRATING LOBES DUE TO SUBARRAY AMPLITUDE TAPERING

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to phased array radar and communication systems, and more specifically to a method of placing a low sidelobe amplitude taper on phased array antennas.

Modern communications and radar systems need high performance antennas to cope with electromagnetic interference. These antennas are required to produce narrow beams and low sidelobes, and operate over a wide range of frequencies and scan angles. In addition, these antennas must reduce unwanted signals entering the main beam and/or sidelobes. The increasing problems with electromagnetic interference motivates system engineers to build antennas with these features.

In the past, reflector antennas were a more practical alternative to the phased array. Hence, large aperture and low sidelobe antennas were usually reflectors. Today, however, low sidelobes and a narrow bandwidth are not sufficient to cope with electromagnetic interference. Since modern antennas must also have wide bandwidth, wide scan angles, adaptive pattern control, and in some applications the ability to conform to the surface of a structure, a phased array is a preferred antenna in many radar and communications systems.

The antennas of phased array radar and communication systems are composed of an array of antenna elements. Each element receives signals from the environment. The phase shifters change the phase of the received signals in such a way that the signals from a given direction all add in phase. After the phase shifters, the signals pass through an amplitude weight where the amplitudes of the signals are changed. The signals from the elements are then added together at the subarray ports. From there the combined signals are amplitude weighted, then added together to form one output signal.

In order to reduce the effects of electromagnetic interference, the amplitude of the signals are weighted in such a way that the far field antenna pattern ahs low sidelobes. Low sidelobes helps the antenna reject all signals, except those entering the mainbeam. Thus, jamming signals entering the sidelobes are rejected. Low sidelobes are very important for radar systems, because of the interference rejection capability. Most phased array antennas currently use amplitude tapering to get the low sidelobes.

Two techniques are available for performing amplitude tapering for generating low sidelobes in the far field pattern of a large array. The first of these techniques entails performing an exact amplitude taper at each of the individual elements in the phased array.

While an exact amplitude taper at each of the individual elements produces the best sidelobes, it also requires complex feed architectures. Such complicated feed architectures are expensive to design, build, test and maintain.

The second technique available for amplitude tapering entails amplitude tapering only at the subarray outputs. While the antenna architecture of systems using this second technique are much simpler, undesirable grating lobes are produced in the far field antenna pattern.

In view of the foregoing discussion, it is apparent that there currently exists the need for a technique for placing a low sidelobe amplitude taper at the subarray port of a phased array without inducing large undesirable grating lobes. The present invention is directed towards satisfying that need.

SUMMARY OF THE INVENTION

The present invention disclosure describes an alternative to either antenna subarray amplitude tapering or exact subarray element tapering for a large antenna array in order to achieve low side lobe amplitudes. The antenna array comprises a plurality of antenna elements grouped into a plurality of subarrays. The subarrays are grouped to provide a common output signal. Each antenna array receives signals from the environment and has a phase shifter which alters the phase so that signals from each element add in phase. The signals from each antenna element are weighted in amplitude and then are added at each subarray port. From each subarray the signals are again weighted in amplitude and combined to form the output signal. The amplitude of the signals are weighted in such a manner that the far field antenna pattern has low or reduced side lobes which help the antenna to reject all signals except those falling within the main beam.

It is a principal object of the present invention to reduce grating lobes due to subarray amplitude tapering.

It is another object of the present invention to minimize the grating lobes found in the far field antenna pattern without the complex architecture and expense of performing an exact amplitude taper at each of the individual antenna elements.

It is another object of the present invention to optimize the sidelobe performance of phased array antennas, while minimizing the cost of their design, construction, test and maintenance.

These together with other objects features and advantages of the invention will become more readily apparent from the following detailed description when taken in conjunction with the accompanying drawings wherein like elements are given like reference numerals throughout.

BRIEF DESCRIPTION OF THE DRAWINGS

FIG. 19*b* is a graph of a far field pattern resulting from the approximate amplitude taper in 19*a.

DETAILED DESCRIPTION OF THE PREFERRED EMBODIMENT

Figure 1:
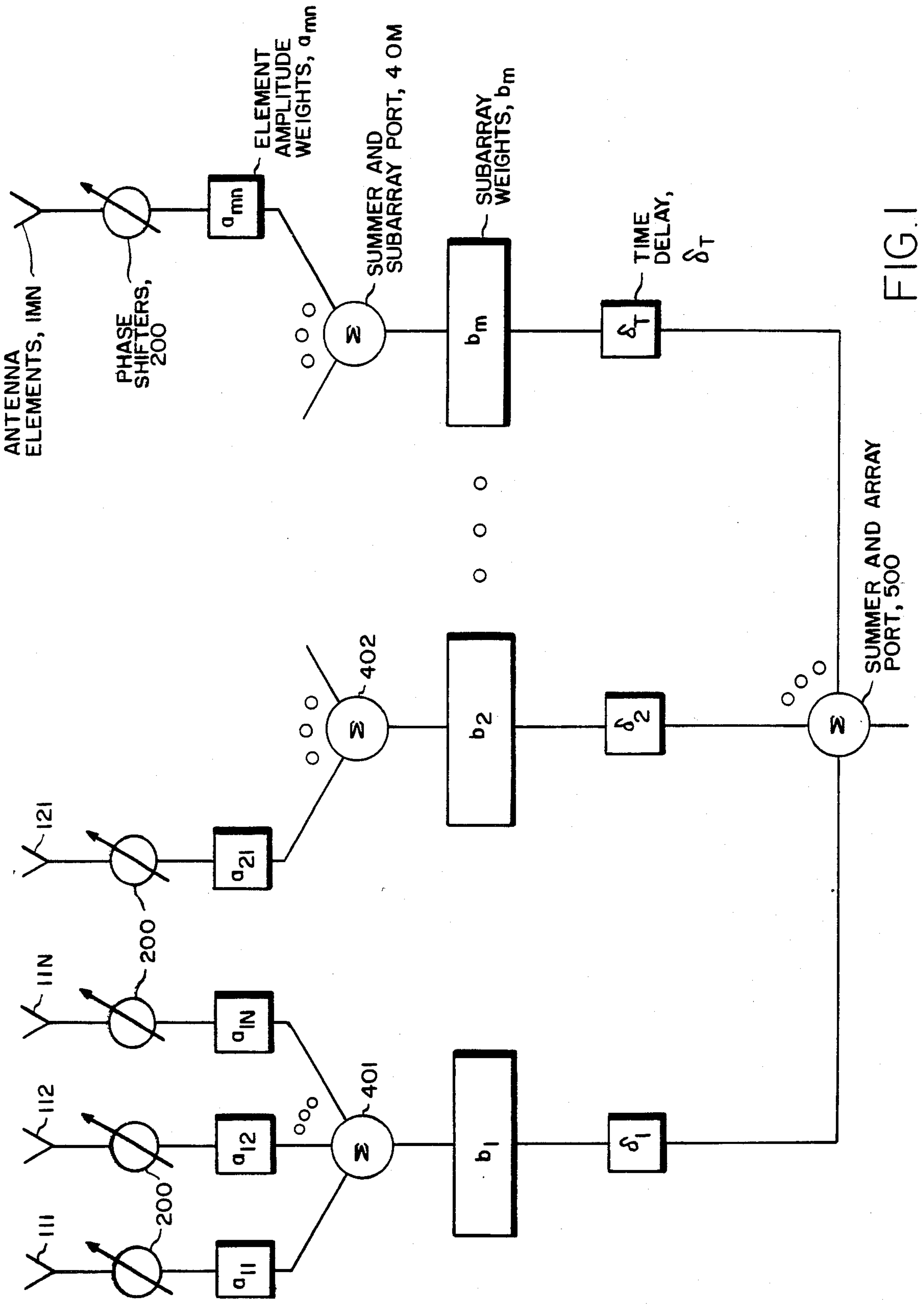
FIG. 1 is a block diagram of a linear array with M subarrays and N elements per subarray.

The present invention includes a method of reducing grating lobes due to subarray amplitude tapering by having a pre-determined identical amplitude taper at the elements of each subarray. FIG. 1 is a block diagram of a linear array divided into M continuous subarrays, each subarray possessing N elements. Element amplitude weights $a_{mn}$ and phase shifters 200 adjust the amplitude and phase of received signals at each antenna element. Each subarray port 401–40M receives and sums the signals produced by each element amplitude weight in its subarray, to produce a subarray output signal, which is, in turn, weighted by a subarray weight $b_1$–$b_m$ and modified by a time delay.

The subarray output signals from each subarray time delay are recieved and summed at the array port 500 to produce the array output signal. Phase shifters and time delay units steer the main beam and amplitude weights lower the sidelobes. Equation (1) gives the far field pattern for a linear array of isotropic elements with the mainbeam pointing at broadside.

$$F(u) = \sum_{m=1}^{M} b_m \sum_{n=1}^{N} a_{mn} e^{jkd_i sin\theta} \quad (1)$$

where $b_m$=amplitude weight at subarray m

M=number of subarrays $a_{mn}$=amplitude weight at element n of subarray m

N=number of elements per subarray $k=2\pi/\lambda$ $\lambda$=wavelength $d_i$=distance of element i from the center of the array (in wavelengths)

$i=(m-1)N+n$

When the values for the subarray $b_m$ weights and element amplitude weights $a_{mn}$ are 1.0, then the array has a uniform amplitude taper and the first sidelobes in the far field pattern are about 13 dB below the peak of the main beam.

Assuming small phase and amplitude errors in the array, the shape of the far field pattern depends on the values of the amplitude weights at the elements and subarrays. Low sidelobes occur from weighting the amplitude of the received signals in such a way that the Fournier Transform of the weights result in the desired sidelobe level. Many formulas exist to derive low sidelobe amplitude tapers for a pre-determined beamwidth and sidelobe characteristics. Taylor, Chebychev, triangular, and cosine are a few. The amplitude taper may appear either at the elements ($a_{mn}$), the subarrays ($b_m$), or both.

Figure 2A:
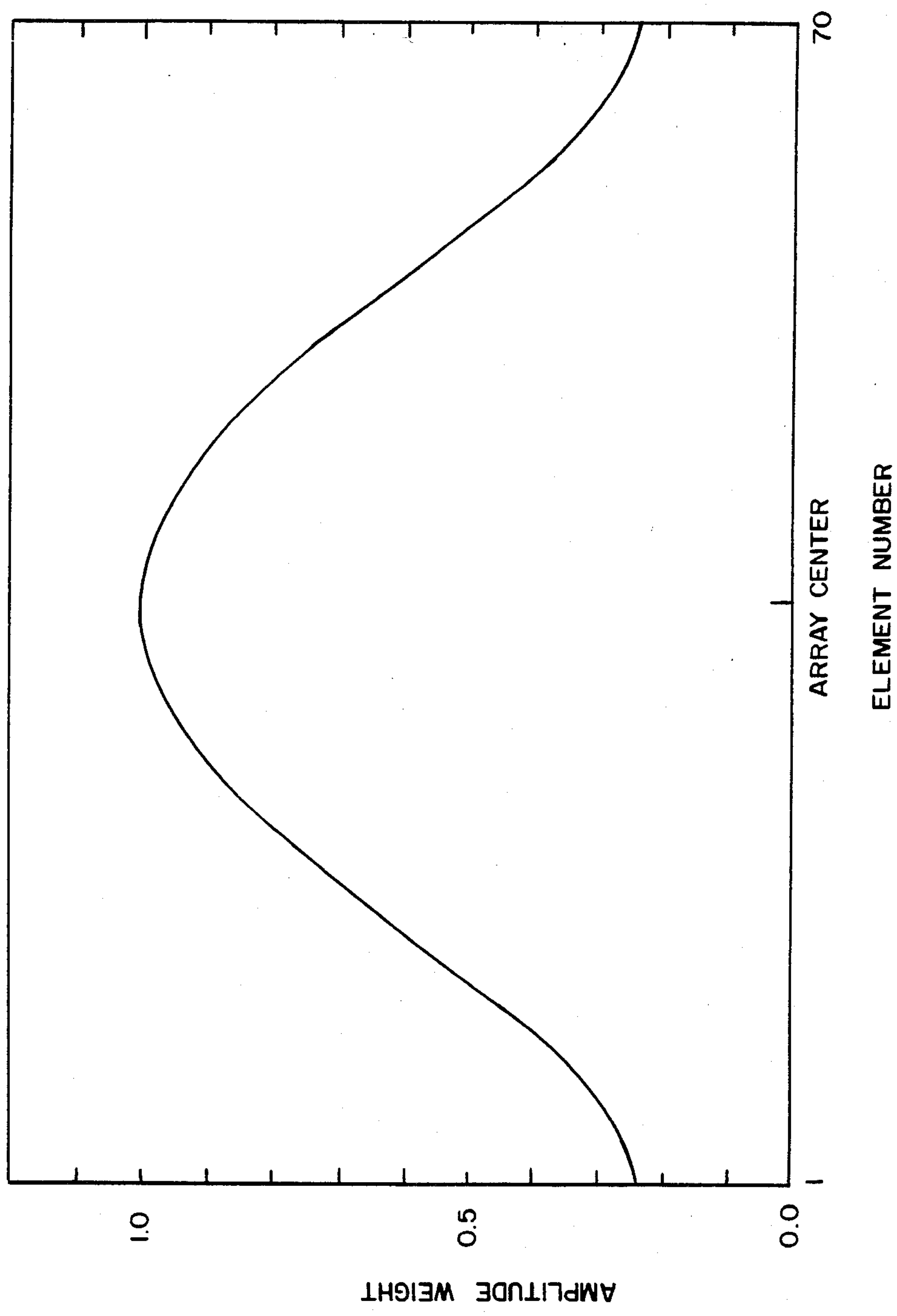
FIG. 2*a* is a graph of 30 dB Taylor amplitude taper.

As mentioned earlier, two techniques are available for performing amplitude tapering for generating low sidelobes in the far field antenna pattern of a large array. The first of these techniques entails performing an exact amplitude taper at each of the individual elements in the array. FIG. 2*a* depicts a particular Taylor distribution applied as an exact amplitude taper at each of the individual elements.

Figure 2B:
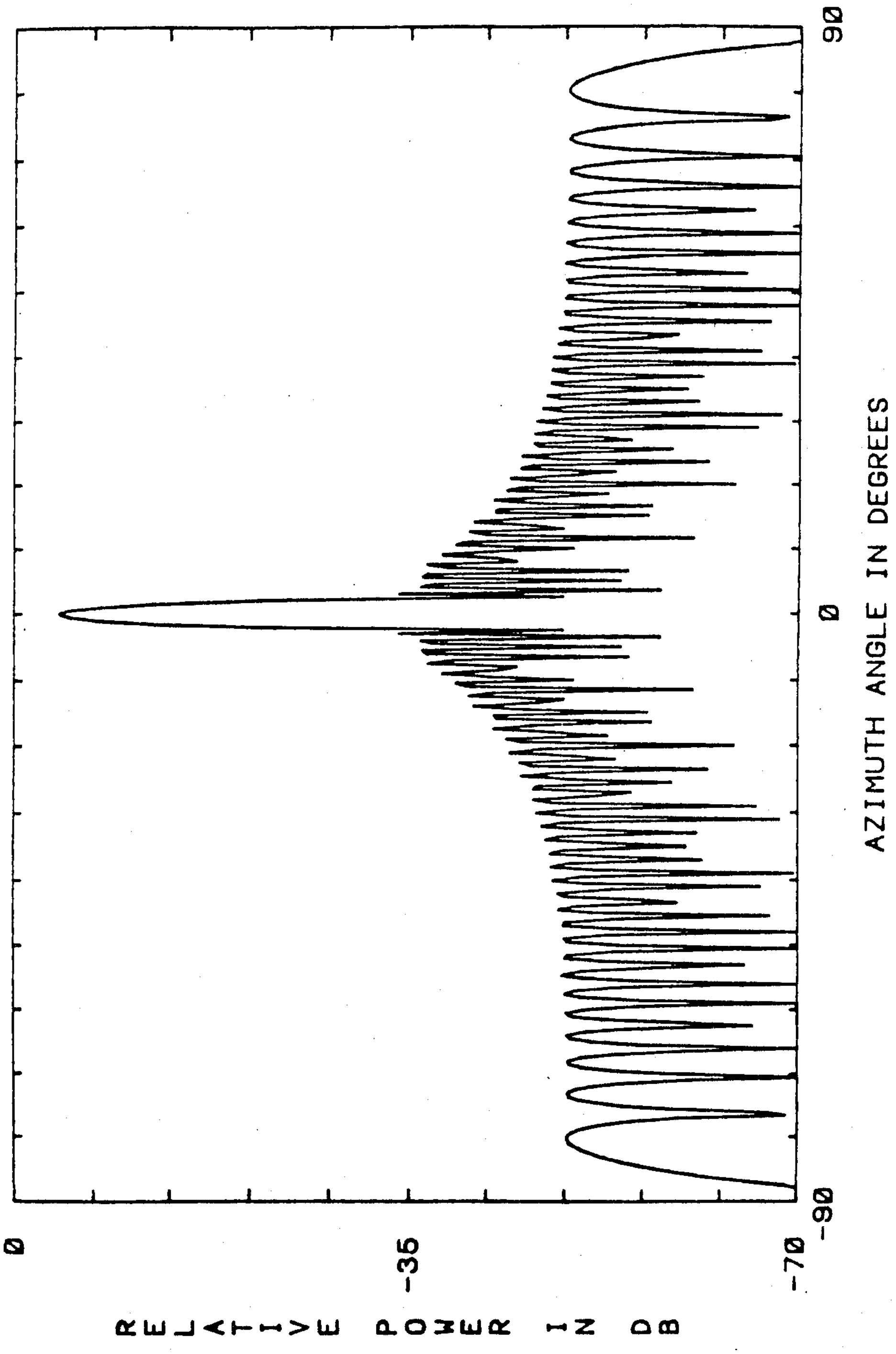
FIG. 2*b* is a graph of a far field pattern of the 70 element array with a 30 dB Taylor amplitude taper.

FIG. 2*a* shows a 30 dB,n=4 Taylor amplitude distribution for a 70 element linear array. The corresponding far field pattern of the 70 element array of isotropic elements spaced one half wavelength apart appears in FIG. 2*b*. This exact amplitude taper is realized in the array by amplitude weights at the individual elements or at the subarrays and elements.

Low sidelobe distributions have different amplitude weights at every element in the array (except at symmetric locations). While an exact amplitude taper at each of the individual elements proudces the best sidelobes, it also requires complex feed architectures which are expensive to design, build, test and maintain.

The second technique available for amplitude tapering entails amplitude tapering only at the subarray output. Amplitude weighting at the subarray's ports simplifies the antenna architecture, but degrades the sidelobe performance. All the elements in a given subarray appear to have the same weight, because the resultant weight at an element is a product of the subarray amplitude and element amplitude. The resulting quantized amplitude taper causes the far field pattern to have grating lobes of the height and the angles predicted by Equation (2). Locations of the grating lobes are given by $$u_p = \frac{P}{Nd} \qquad (2)$$

where $u_p = \sin\theta$ $\theta$=direction of grating lobe

N=number of elements per subarray d=element spacing in wavelengths $p = \pm(1,2, \ldots)$ Equation (3) yields the peaks of the grating lobes (GP) derived in Equation (2)

$$GP = \frac{B^2}{M^2N^2\sin^2(\pi p/N)} \qquad (3)$$

where

B=beam broadening factor. It is the ratio of the 3 dB beamwidth of the tapered array to that of a uniformly illuminated array.

M=number of subarrays

Figure 3A:
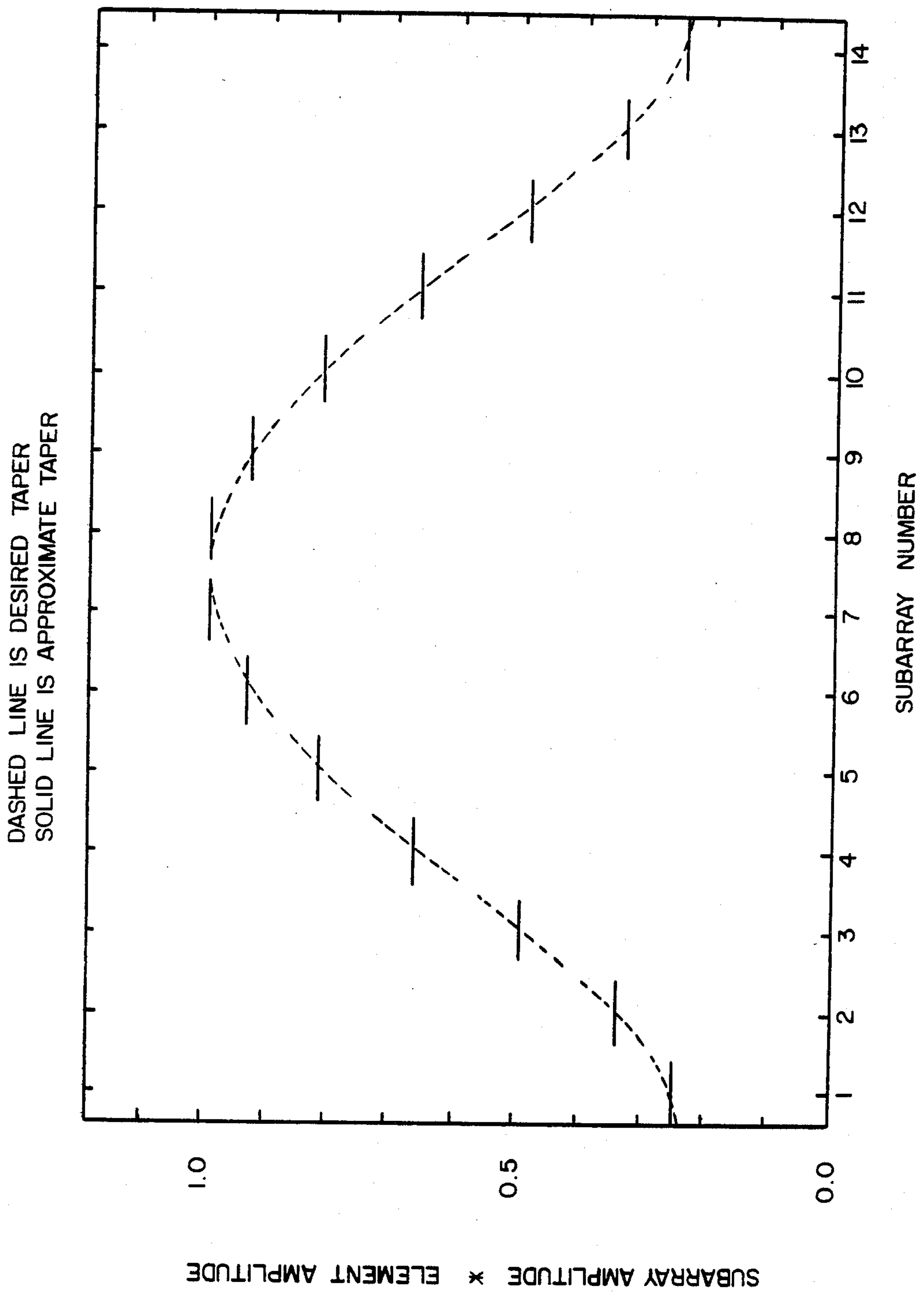
FIG. 3*a* is a graph of an effective element amplitude distribution due to a 30 dB Taylor amplitude taper applied at the outputs of 14 subarrays.
Figure 4A:
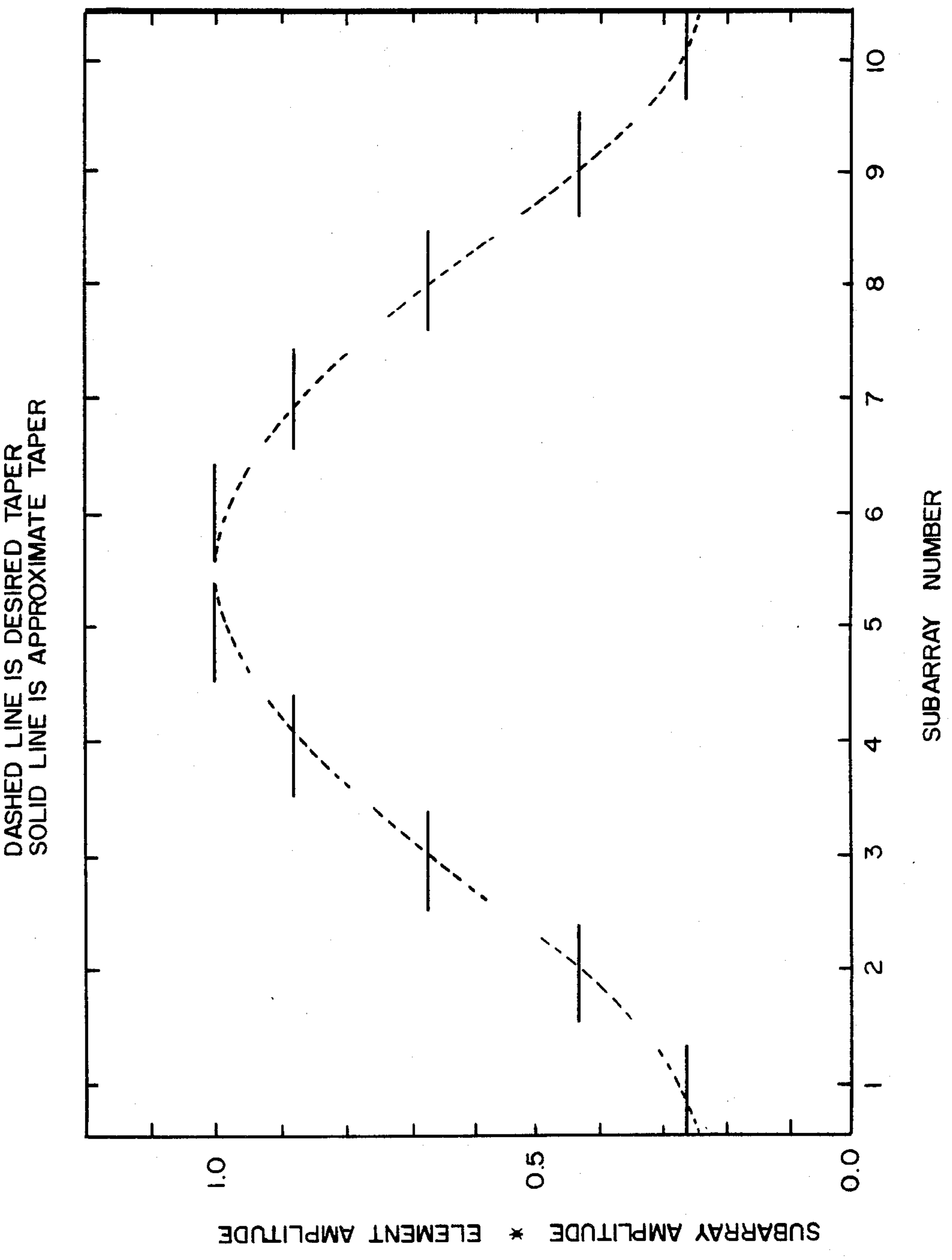
FIG. 4*a* is a graph of an effective element amplitude distribution due to a 30 dB Taylor amplitude taper applied at the outputs of 10 subarrays.

Examples of the effects of subarray amplitude tapering are shown in FIGS. 3*a* and 4*a*.

FIGS. 3*a* and 4*a* are attempts to apply the low sidelobe taper shown in FIGS. 2*a*, except that only subarray amplitude tapering is used on the 70 element array.

FIG. 3*a* shows subarray amplitude tapering for 14 subarrays of 5 elements per subarrays, while FIG. 4*a* shows subarray amplitude tapering for 10 subarrays of 7 elements per subarray. The beam broadening factor for a 30 dB, n=4 Taylor distribution is 1.25.

Tables 1 and 2 show the sidelobe location and levels resulting from subarray tapering for different effective element weights p. Table 1 is associated with the subarray tapering of FIG. 3*a* and Table 2 is associated with the subarray tapering of FIG. 4*a*.

TABLE 1

| | M = 14 and N = 5 | |
|---|---|---|
| P | Location in Degrees from Eq. (2) | Sidelobe Level in dB Below the Main Beam from Eq. (3) |
| 1 | ±23.1 | 30.3 |
| 2 | ±53.1 | 34.5 |

TABLE 2

| | M = 10 and N = 7 | |
|---|---|---|
| P | Location in Degrees from Eq. (2) | Sidelobe Level in dB Below the Main Beam from Eq. (3) |
| 1 | ±16.6 | 27.7 |
| 2 | ±34.8 | 32.8 |
| 3 | ±59 | 34.7 |

Figure 3B:
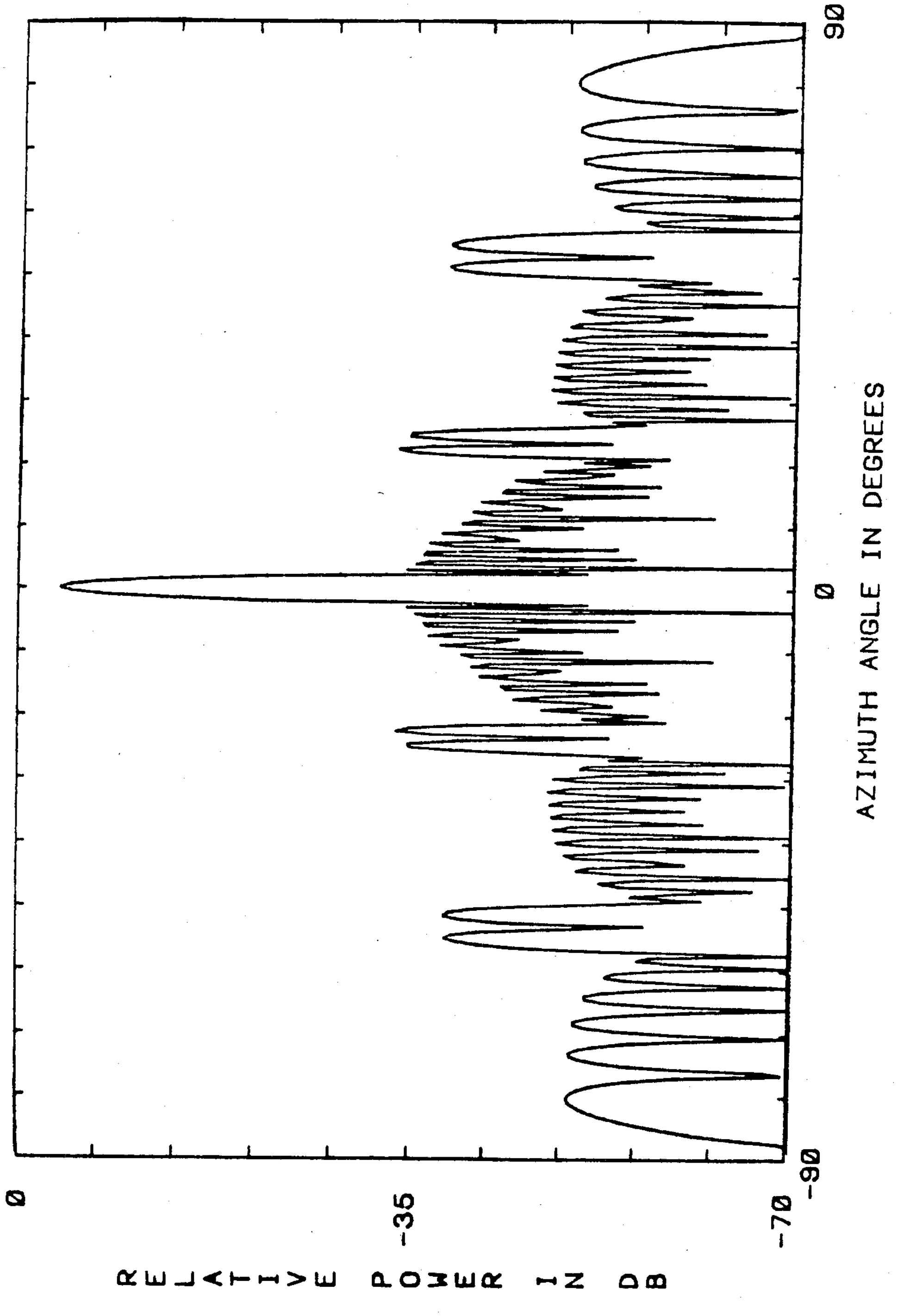
FIG. 3*b* is a graph of a far field pattern resulting from the approximate taper in 3*a;*
Figure 4B:
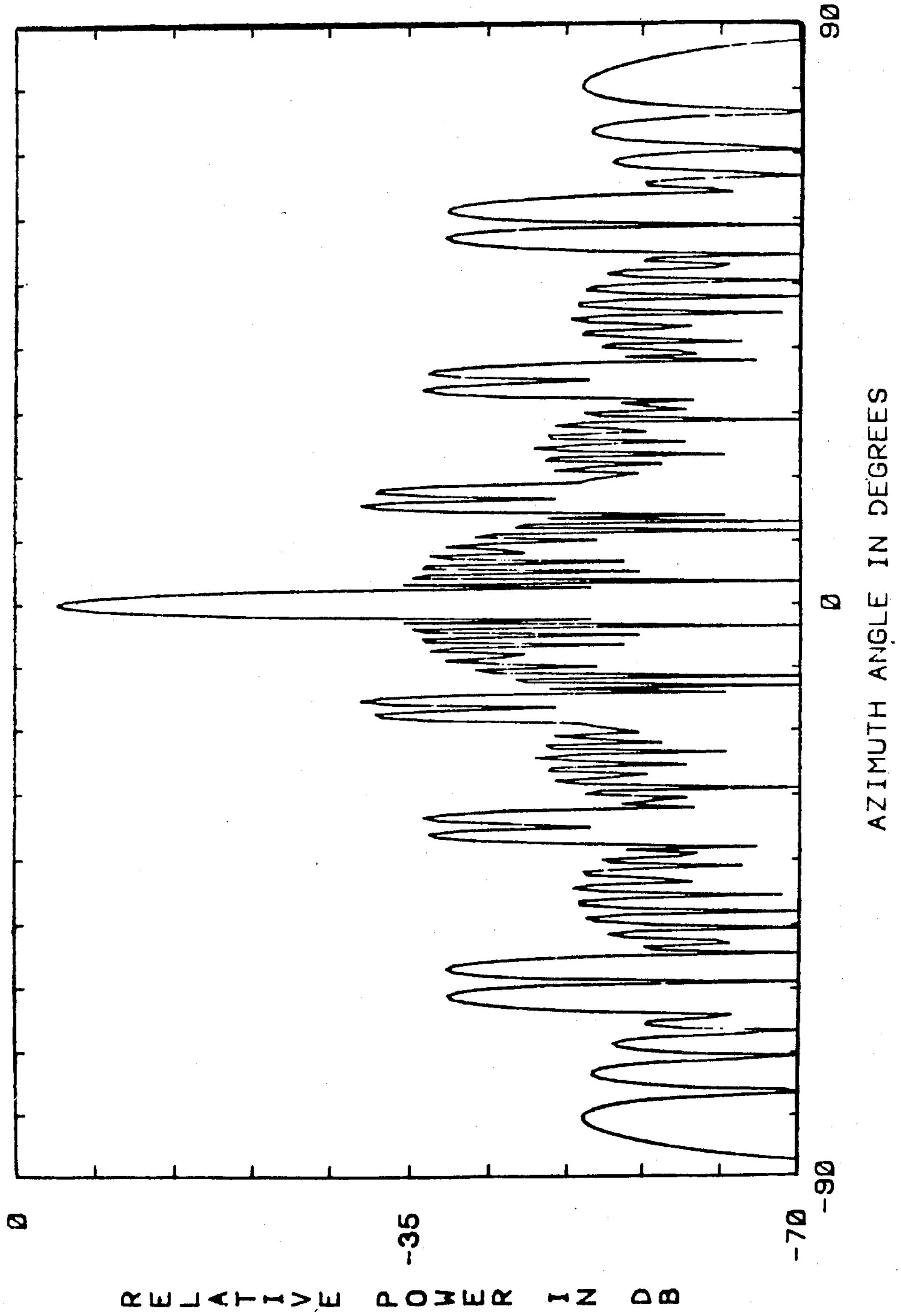
FIG. 4*b* is a graph of a far field pattern resulting from the approximate amplitudetaper in 4*a;*

FIG. 3*b* shows the far field pattern associated with the subarray tapering approach of FIG. 3*a;* and FIG. 4*b* shows the far field pattern associated with the subarray tapering approach of FIG. 4*a*. As expected, FIGS. 3*b* and 4*b* indicate that amplitude weighting at subarray ports alone results in degraded sidelobe performance.

Amplitude tapering only at the subarray outputs would be a good idea if the grating lobes were not formed. Grating lobes form because of the periodic amplitude quantization at the elements. All the elements in the same subarray have the same amplitude weight. Hence, the quantized amplitude taper is a poor approximation of the desired amplitude tper, as shown in FIGS. 3*a* and 4*a*. This approximation improves when the elements within a subarray are also given an appropriate amplitude taper. In turn, the far field pattern becomes more acceptable.

The approximation becomes exact when $b_m a_{mn}$=desired amplitude weight at element i where $i=(m-1)M+n$ for $m=1, 2, \ldots, M$ $n=1, 2, \ldots, N$ The exact solution has different amplitude weights at each element. (Only the symmetric elements and subarrays have corresponding identical amplitude weights. Thus, the exact solution produces the desired far field pattern, but has M/2 different element tapers within the subarrays for the M subarrays.

Two techniques have been discussed for generating low sidelobes in the far field pattern of a large array. On the one hand, an amplitude taper at the individual elements produces the best sidelobes, but at the cost of complex feed architectures. On the other hand, an amplitude taper only at the subarray outputs provides a simple, cost effective way to implement the taper, but causes grating lobes to form. Rather than using either of these techniques, the present invention makes a tradeoff between simplicity of design and performance by having an amplitude taper at the subarray outputs in conjunction with an identical element amplitude taper for every subarray. In addition, there are amplitude weights at the subarray outputs. This new amplitude taper maintains the advantages of having identical subarrays in addition to reducing the grating lobes.

The present invention improves the approximation of exact element amplitude tapering, while applying identical amplitude tapering to corresponding antenna elements in each subaray. Multiplying the tapered element amplitude weights by their subarray amplitude weight produces a closer approximation to the desired amplitude distribution than the uniformly weighted elements.

Since every subarray in the present invention, has an identical amplitude taper at corresponding elements, all the subarrays are interchangable, and the advantages of subarray tapering remain. At the same time, the far field pattern is a closer approximation to the desired far field pattern, than in the case of tapering at the subarray outputs alone.

FIG. 3*b* shows the far field pattern resulting from a 30 dB Taylor amplitude taper at the output ports of 14 subarrays with 5 elements per subarray. The element weights within the subarray are unknown. Since the desired amplitude taper and the subarray amplitude weights are known, the unknown element weights can be found. Assume that every subarray has identical element amplitude weights represented by q, r, s, t, and v. With this information a set of equations is formed for each subarray.

| | |
|---|---|
| $qb_m$ = | desired amplitude taper at element 1 in subarray m |
| $rb_m$ = | desired amplitude taper at element 2 in subarray m |
| $sb_m$ = | desired amplitude taper at element 3 in subarray m |
| $tb_m$ = | desired amplitude taper at element 4 in subarray m |
| $vb_m$ = | desired amplitude taper at element 5 in subarray m |

For our 70 element array these equations are: Subarray weight ($b_m$) x element weight ($a_{mn}$)=approximation of Taylor amplitude taper

| Subarray 1 | Subarray 2 | Subarray 3 | Subarray 4 | Subarray 5 | Subarray 6 | Subarray 7 |
|---|---|---|---|---|---|---|
| .254q = .243 | .345q = .299 | .496q = .431 | .666q = .599 | .820q = .762 | .931q = .893 | q = .973 |
| .254r = .247 | .345r = .320 | .496r = .463 | .666r = .633 | .820r = .791 | .931r = .913 | r = .983 |
| .254s = .254 | .345s = .345 | .496s = .496 | .666s = .666 | .820s = .820 | .931s = .931 | s = .991 |
| .254t = .266 | .345t = .372 | .496t = .530 | .666t = .669 | .820t = .846 | .931t = .947 | t = .997 |
| .254v = .281 | .345v = .401 | .496v = .564 | .666v = .731 | .820v = .960 | .931v = .960 | v = 1.000 |

Only half of the subarrays are evaluated since the other half are mirror images.

Values for q, r, s, t, and v are found for each subarray by solving the 7 sets of equations. The variables have different values for every subarray. These values represent the exact solution (see Table 3 under Exact Element Taper column). In order to get approximate values for q, r, s, t, and v that will be the same for every subarray, the variables were averaged for corresponding elements of each subarray. Averaging the variables over the 7 subarrays gives the following average values for q, r, s, t, and v:

q=0.922 r=0.959 s=0.999 t=1.041 v=1.085

Table 3 shows the new configuration for the amplitude weights under the column "Approximation With All Identical Subarrays". Multiplying the subarray weights by the amplitude weights at each element gives a closer approximation to the desired amplitude taper than tapering at the subarray outputs alone.

Table 3 is a table of subarray and element weights for one half of a linear phased array containing 14 subarrays, each having 5 antenna elements. The first and second columns respectfully identify the individual subarrays and antenna elements. The third column identifies a selected subarray amplitude weight, which will be applied to the subarray.

The fifth column of table 3 is the resulting element amplitude taper, which is obtained by multiplying the subarray amplitude weight of column 3 by the individual element weight of column 4. This fifth column however, in a design process, is selected as a set of ideal individual element amplitude weights: the weight values indicated by some "ideal" distribution, such as in FIG. 2*a*, which should be applied to exactly taper the signals of individual elements to yield a far field pattern with low sidelobes. The effect of the exact individual element weights, listed in column 5, may be obtained by applying the subarray weights of column 3 and the element weights of column 4.

In the present invention, the element weights of column 4 are not actually applied, but are used for the purpose of calculating the weights of column 6 by averaging the individual weights in column 4 for corresponding elements in each identical subarray. That is, the weights of element number 1, 6, 11, 16, 21, 26 and 31 listed in column 4 are averaged to yield 0.922, listed in column 6. This process is continued for each corresponsing nth element in the subarrays.

Column 7 is a list of the resulting effective element weight, which is obtained by multiplying each subarray weight, of column 3, by the element weights of column 6.

Columns 8 and 9 are examples of the above process where there are two groups of identical subarrays: 1-5, and 6-7.

Columns 10 and 11 are examples of the above process where there are 3 groups of identical elements.

TABLE 3

| Sub-array | Elem. | Subarray Weight | Exact Element Amplitude Elem. | Exact Element Amplitude Res. | Approx. with All Iden Subarr Elem. | Approx. with All Iden Subarr Res. | Approx. w/2 Grp of Iden Subarr Elem. | Approx. w/2 Grp of Iden Subarr Res. | Approx. w/3 grp of Iden Elem. Elem. | Approx. w/3 grp of Iden Elem. Res. |
|---|---|---|---|---|---|---|---|---|---|---|
| 1 | 1 | .254 | .957 | .243 | .922 | .234 | .904 | .230 | .898 | .228 |
| | 1 | | .972 | .247 | .959 | .244 | .950 | .241 | .946 | .240 |
| | 3 | | 1.000 | .254 | .999 | .254 | .999 | .254 | 1.000 | .254 |
| | 4 | | 1.047 | .266 | 1.041 | .264 | 1.055 | .268 | 1.061 | .269 |
| | 5 | | 1.106 | .281 | 1.085 | .276 | 1.113 | .283 | 1.126 | .286 |
| 2 | 6 | .345 | .867 | .299 | .922 | .318 | .904 | .312 | .898 | .310 |
| | 7 | | .928 | .320 | .959 | .331 | .950 | .328 | .946 | .326 |
| | 8 | | 1.000 | .345 | .999 | .345 | 1.000 | .345 | 1.000 | .345 |
| | 9 | | 1.078 | .372 | 1.041 | .359 | 1.055 | .364 | 1.061 | .366 |
| | 10 | | 1.162 | .401 | 1.085 | .374 | 1.113 | .384 | 1.126 | .388 |
| 3 | 11 | .496 | .869 | .431 | .922 | .457 | .904 | .448 | .898 | .445 |

TABLE 3-continued

| Sub-array | Elem. | Subarray Weight | Exact Element Amplitude Elem. | Res. | Approx. with All Iden Subarr Elem. | Res. | Approx. w/2 Grp of Iden Subarr Elem. | Res. | Approx. w/3 grp of Iden Elem. Elem. | Res. |
|---|---|---|---|---|---|---|---|---|---|---|
| | 12 | | .993 | .463 | .959 | .476 | .950 | .471 | .946 | .469 |
| | 13 | | 1.000 | .496 | .999 | .496 | 1.000 | .496 | 1.000 | .496 |
| | 14 | | 1.069 | .530 | 1.041 | .516 | 1.055 | .523 | 1.061 | .526 |
| | 15 | | 1.137 | .564 | 1.085 | .538 | 1.113 | .552 | 1.126 | .558 |
| 4 | 16 | .666 | .899 | .599 | .922 | .614 | .904 | .602 | .898 | .598 |
| | 17 | | .950 | .633 | .959 | .639 | .950 | .633 | .946 | .630 |
| | 18 | | 1.000 | .666 | .999 | .666 | 1.000 | .666 | 1.000 | .666 |
| | 19 | | 1.050 | .699 | 1.041 | .693 | 1.055 | .703 | 1.061 | .707 |
| | 20 | | 1.098 | .731 | 1.085 | .723 | 1.113 | .741 | 1.126 | .750 |
| 5 | 21 | .820 | .929 | .762 | .922 | .756 | .904 | .741 | .944 | .774 |
| | 22 | | .965 | .791 | .959 | .786 | .950 | .779 | .973 | .796 |
| | 23 | | 1.000 | .820 | .999 | .819 | 1.000 | .820 | 1.000 | .820 |
| | 24 | | 1.032 | .846 | 1.041 | .854 | 1.055 | .865 | 1.025 | .841 |
| | 25 | | 1.061 | .870 | 1.085 | .890 | 1.113 | .913 | 1.046 | .858 |
| 6 | 26 | .931 | .954 | .893 | .922 | .858 | .966 | .899 | .944 | .879 |
| | 27 | | .981 | .913 | .959 | .893 | .982 | .914 | .923 | .906 |
| | 28 | | 1.000 | .931 | .999 | .930 | .996 | .927 | 1.000 | .931 |
| | 29 | | 1.017 | .947 | 1.041 | .969 | 1.007 | .938 | 1.025 | .954 |
| | 30 | | 1.031 | .960 | 1.085 | 1.010 | 1.016 | .946 | 1.046 | .974 |
| 7 | 31 | 1.0 | .973 | .973 | .922 | .922 | .966 | .966 | .973 | .973 |
| | 32 | | .983 | .983 | .959 | .959 | .982 | .982 | .983 | .893 |
| | 33 | | .991 | .991 | .999 | .999 | .996 | .996 | .991 | .991 |
| | 34 | | .997 | .997 | 1.041 | 1.041 | 1.007 | 1.007 | .997 | .997 |
| | 35 | | 1.000 | 1.000 | 1.085 | 1.085 | 1.016 | 1.016 | 1.000 | 1.000 |

Figure 5A:
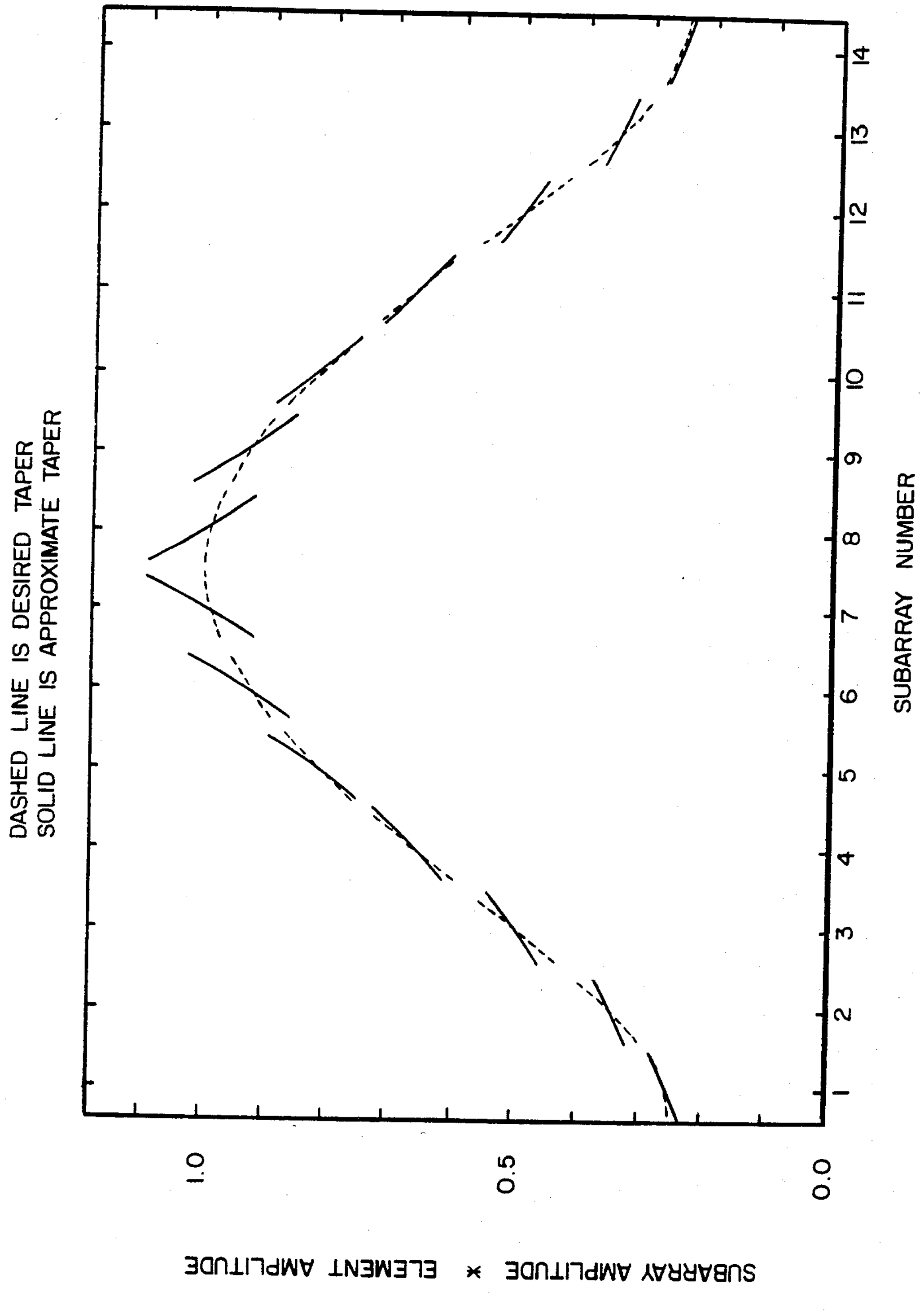
FIG. 5*a* is a graph of a 30 dB Taylor amplitude taper with identical element amplitude tapers in each of the 14 subarrays.
Figure 5B:
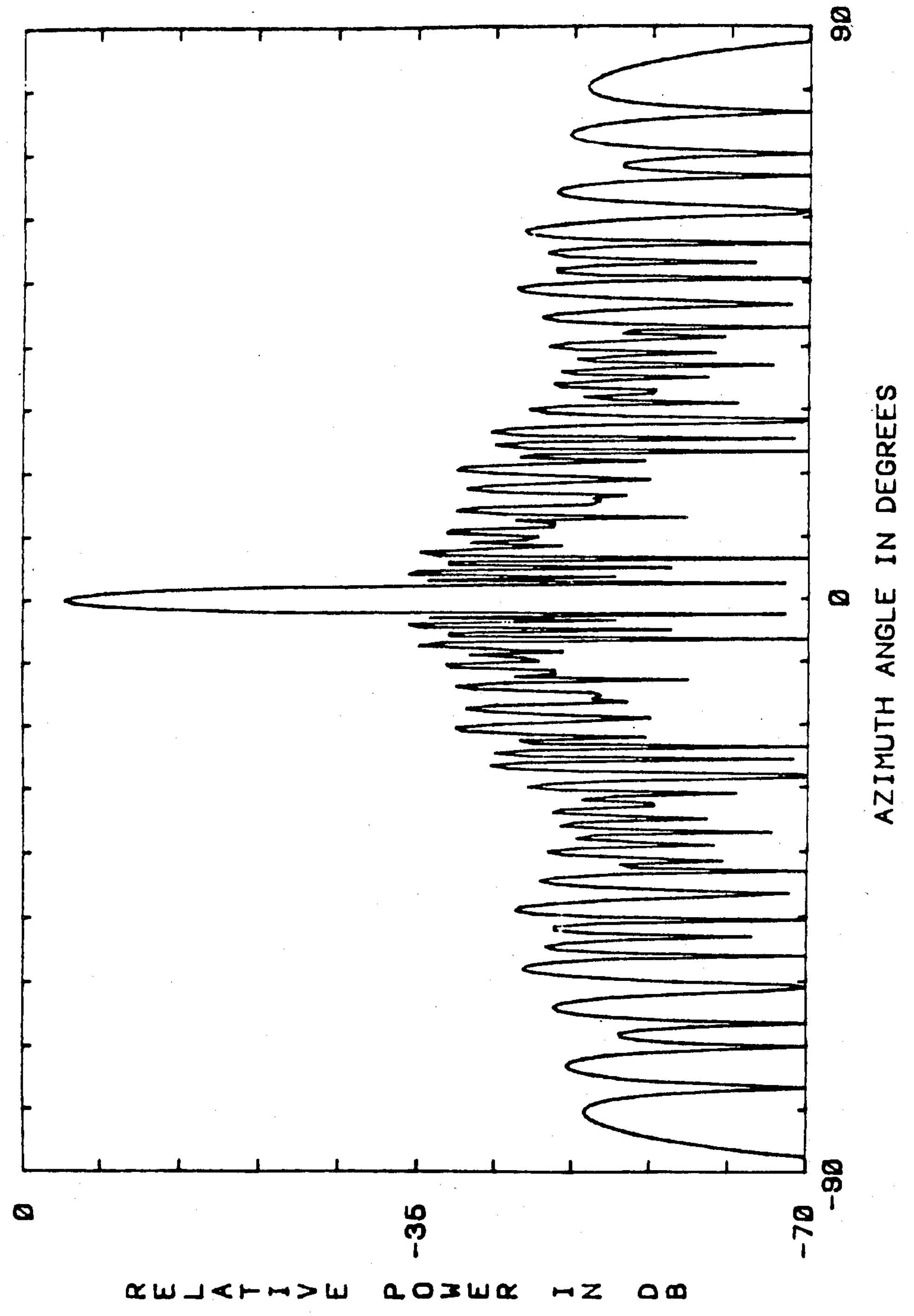
FIG. 5*b* is a graph of a far field pattern resulting from the approximate taper in 5*a;*

FIG. 5*a* shows the approximate taper superimposed on the desired taper of FIG. 2*a*, when the amplitude weights in the column "Approximation With All Identical Subarrays" of Table 3 is applied to each of the 14 subarrays. The approximate values are close to the desired values in the 5 subarrays on the edge. The resulting amplitude tapers at the middle subarrays (subarrays 6 and 7) are poor approximations to the desired tapers. In spite of this crude approximation, the far field pattern in FIG. 5*a* compares reasonably well with the desired pattern in FIG. 2*b*. Sidelobes are somewhat higher than desired, but the grating lobes no longer appear. In general, the antenna pattern in FIG. 5*b* is much more desirable than the antenna pattern due to amplitude tapering at the subarray outputs (FIG. 3*b*).

Since the element amplitude tapers within subarrays 6 and 7 resulting in a poor approximation to the desired Taylor amplitude taper, they were averaged separate from the other five subarrays. Therefore, columns 8 and 9 of table 3 depicts that there are two groups of identical subarrays. Group 1 has subarrays 1 to 5 and Group 2 contains subarrays 6 and 7. Instead of averaging the variables q, r, s, t, and v over all the subarrays, an average is found for each group. The new element weights are shown below.

| Group 1 | Group 2 |
|---|---|
| q = .904 | q = .966 |
| r = .950 | r = .982 |
| s = 1.000 | s = .996 |
| t = 1.055 | t = 1.007 |
| v = 1.113 | v = 1.016 |

Figure 6A:
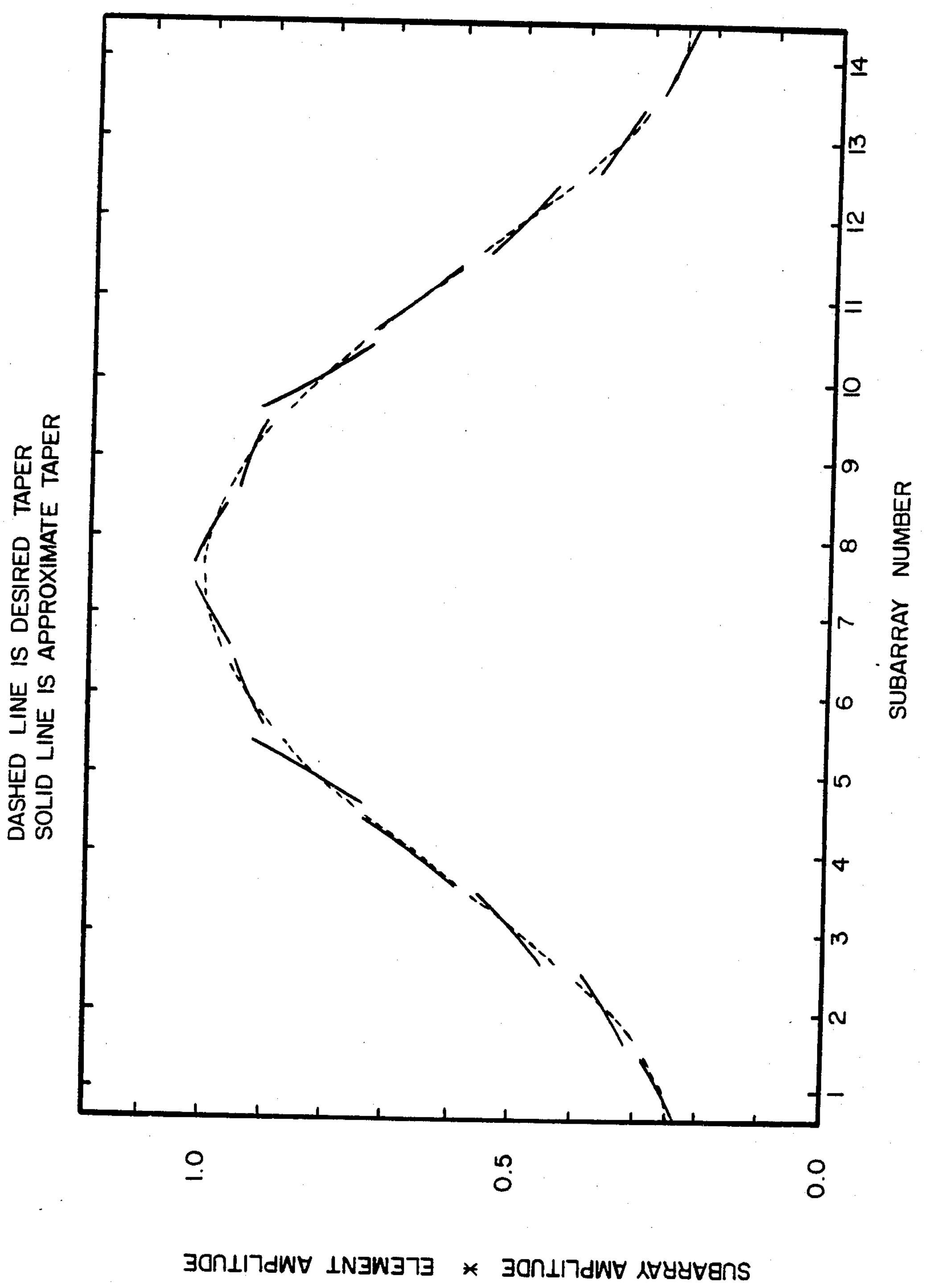
FIG. 6*a* is a graph of a 30 dB subarray amplitude taper with two groups of identical subarrays (subarrays 1 to 5, and 6 to 7)
Figure 6B:
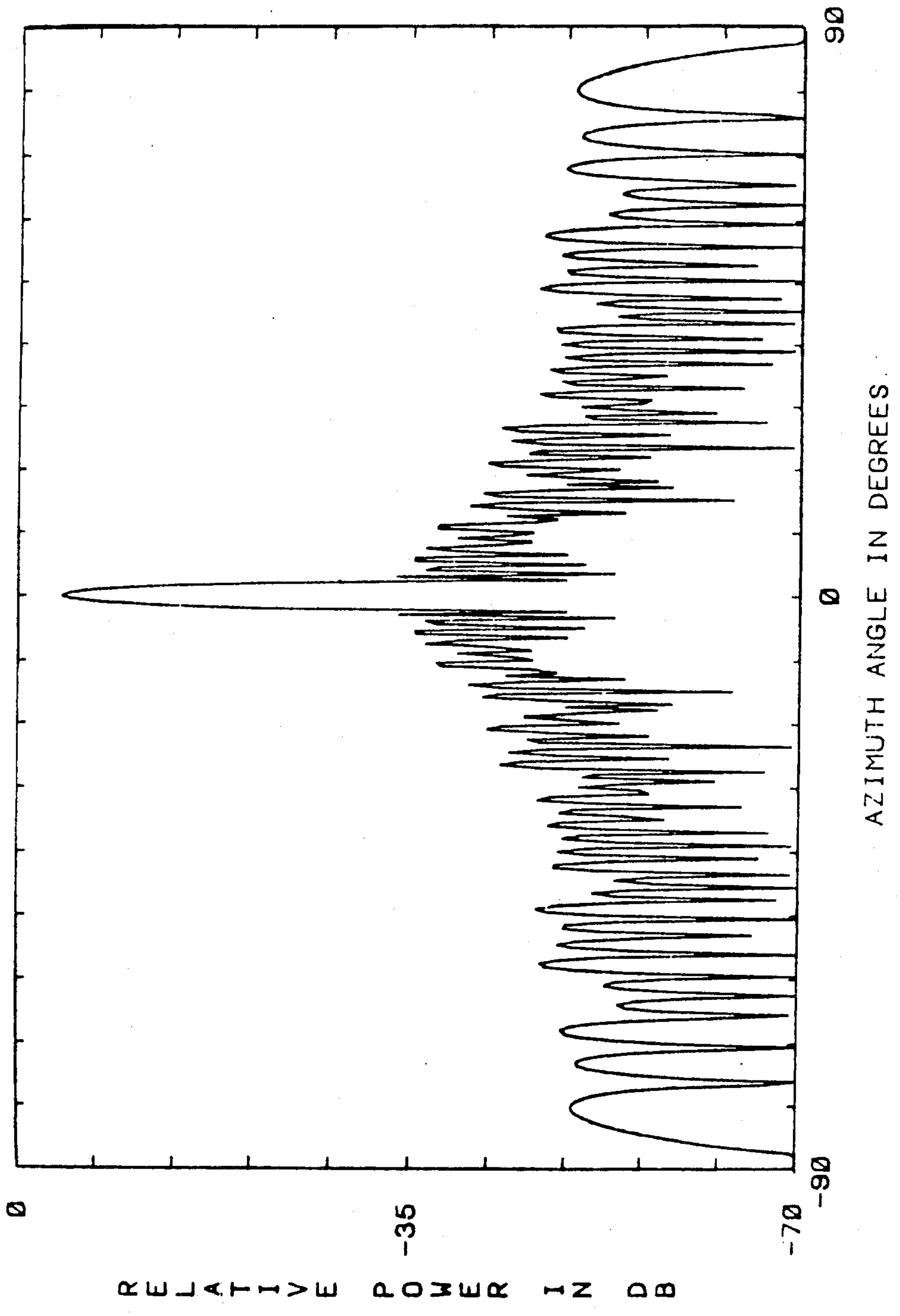
FIG. 6*b* is a graph of a far field pattern resulting from the approximate amplitude taper in 6*a;*

Table 3 shows the array configuration for these two groups of subarrays. The approximation to the desired Taylor amplitude taper improves at the cost of having two different types of element tapers within the subarrays instead of one. FIG. 6*a* shows the new approximation superimposed on the desired taper. The resulting far field pattern appears in FIG. 6*b*. No grating lobes are present and the sidelobes are close to the desired levels.

Figure 7A:
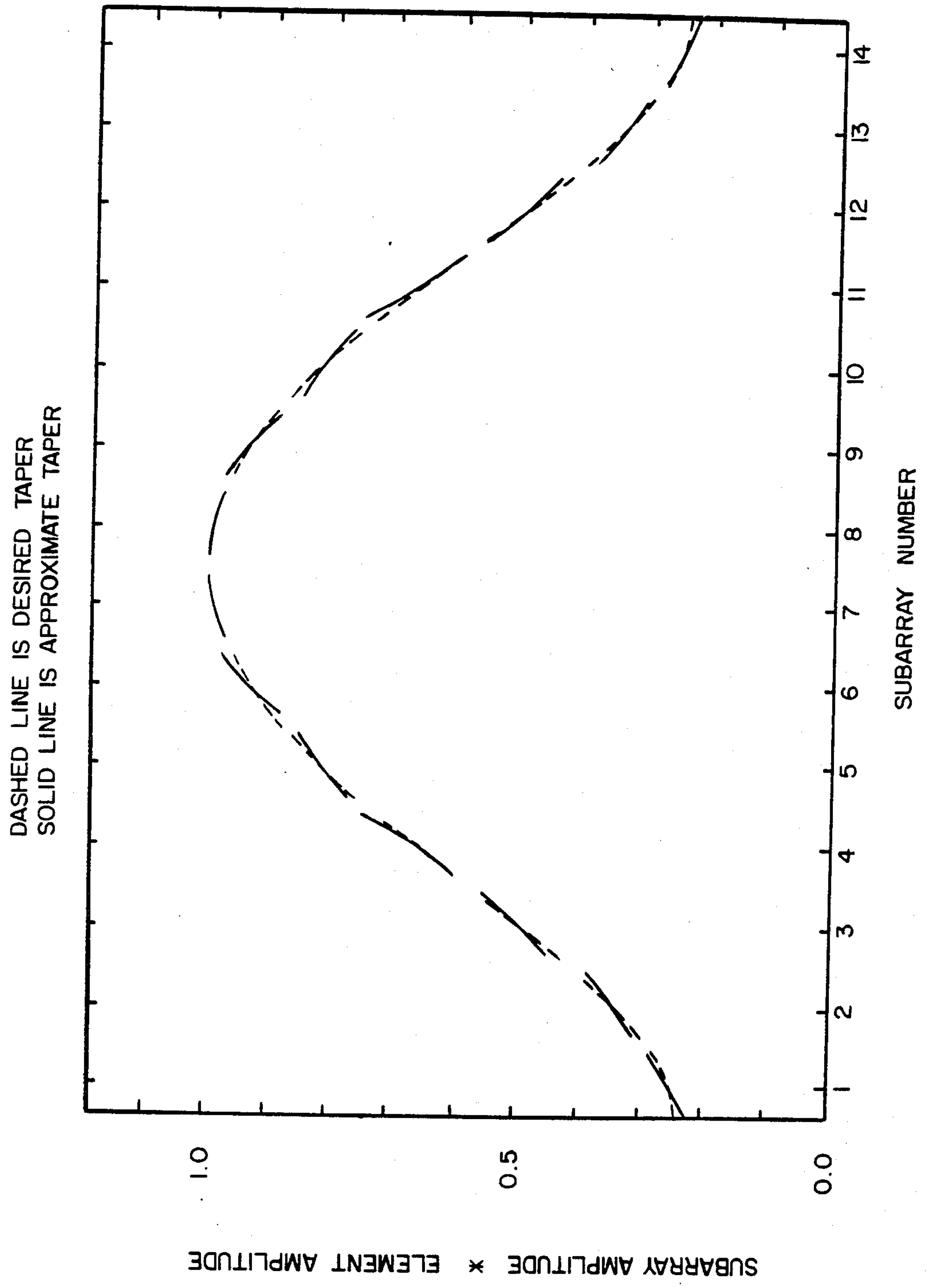
FIG. 7*a* is a graph of a 30 dB subarray amplitude taper with three groups of identical subarrays (subarrays 1 to 4, 5, 6 to 7)
Figure 7B:
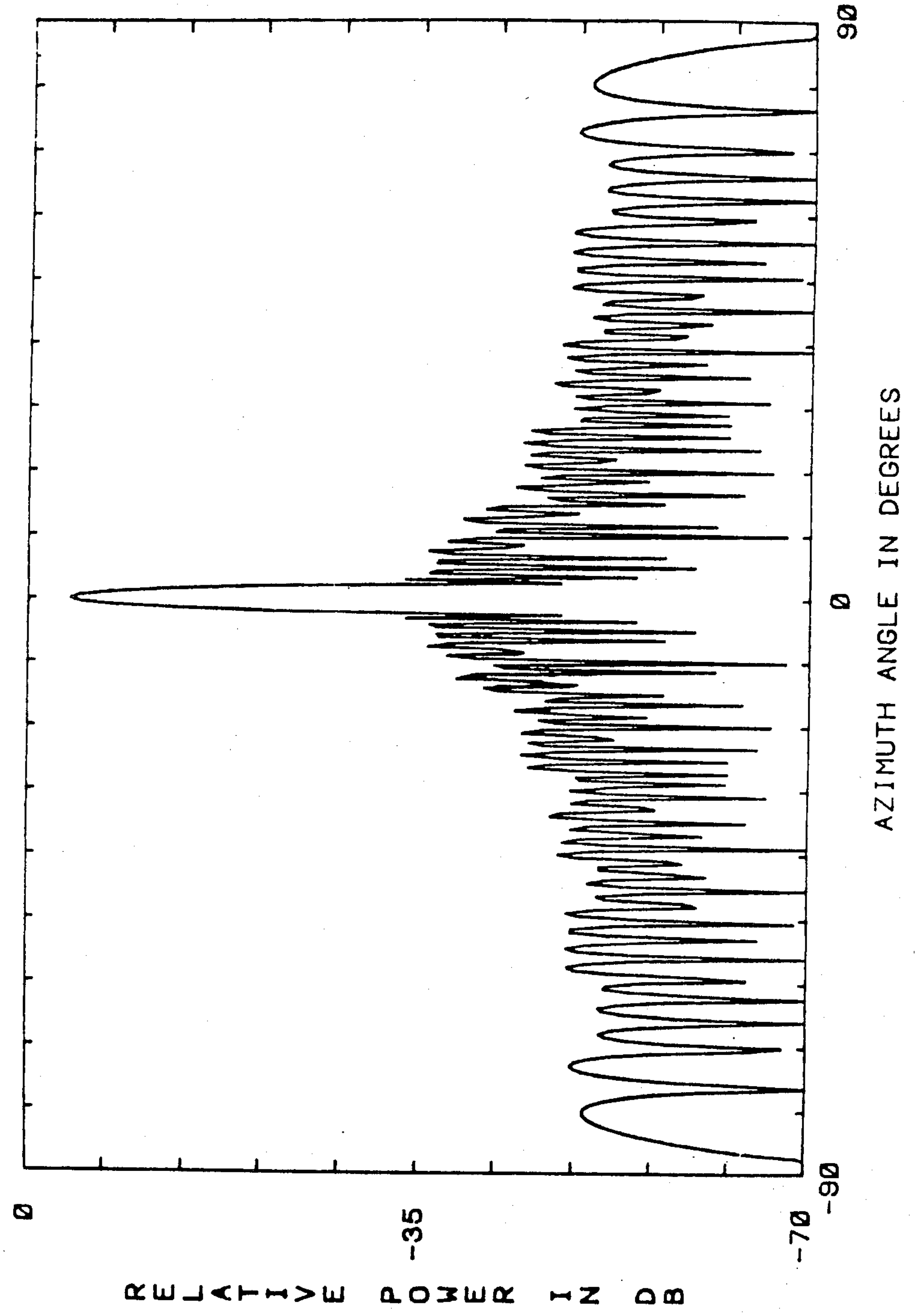
FIG. 7*b* is a graph of a far field pattern resulting from the approximate amplitude taper in 7*a;*

One further step was taken to improve the approximation to the amplitude taper. The subarrays were divided into 3 groups. Group 1 had subarrays 1 1 to 4, group 2 had subarrays 5 and 6, and group 7 was subarray 7. Table 1 shows the resulting amplitude taper. This taper along with the desired taper is shown in FIG. 7*a*. The resulting far field pattern appears in FIG. 7*b*. As expected, the sidelobes are closer to the desired sidelobes than the other approximations.

Figure 8A:
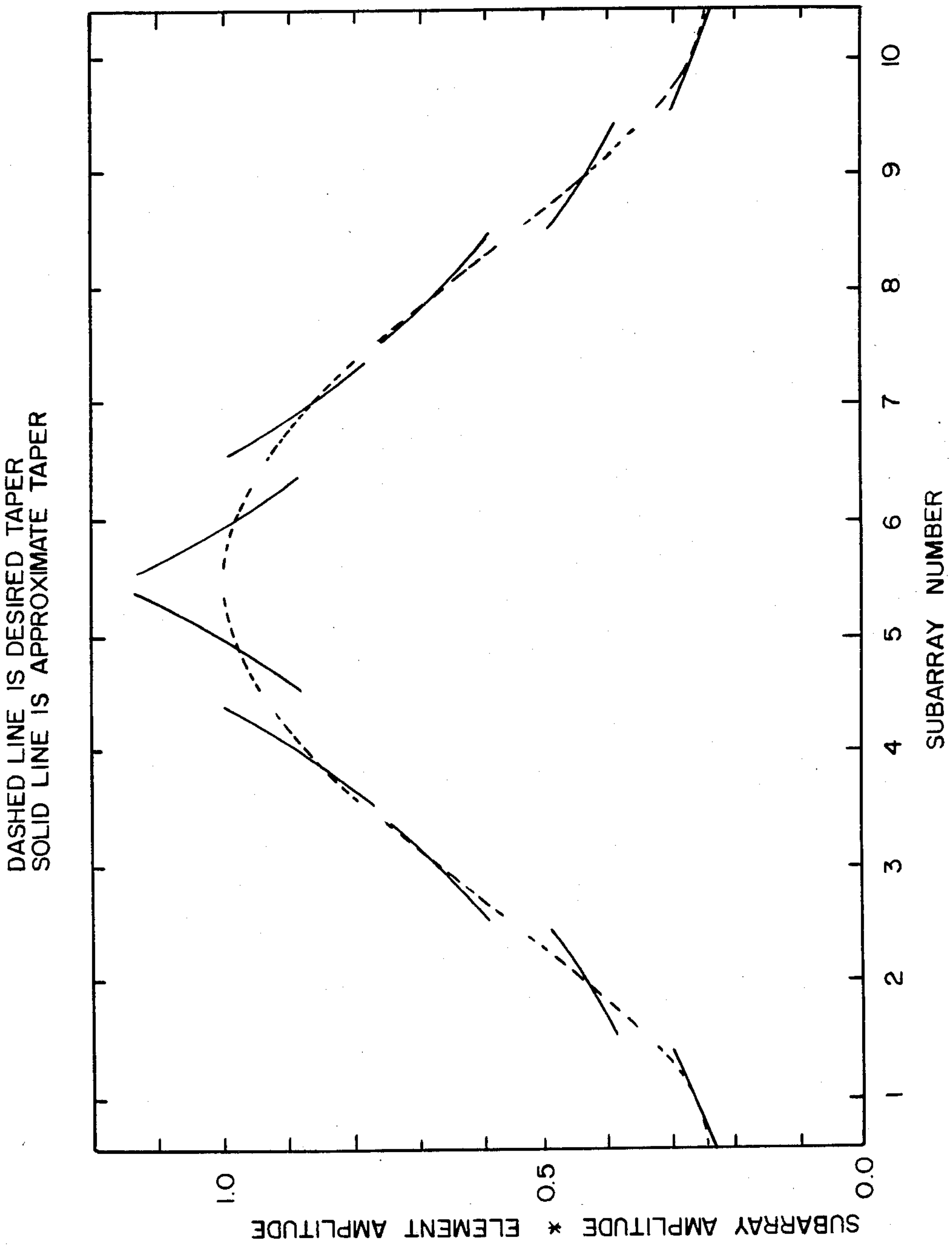
FIG. 8*a* is a graph of a 30 dB subarray amplitude taper with identical element amplitude tapers in each of the 10 subarrays.
Figure 8B:
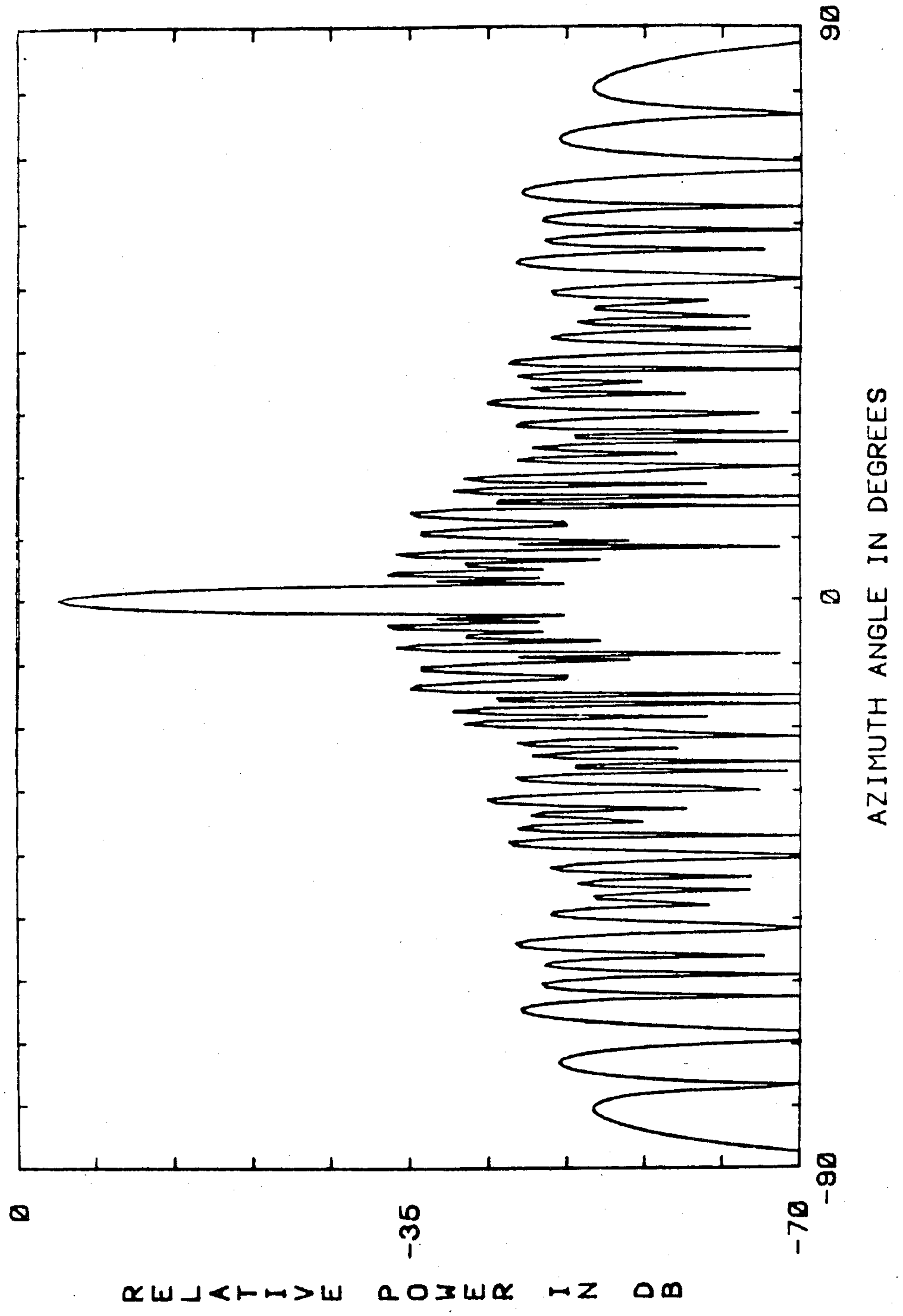
FIG. 8*b* is a graph of a far field pattern resulting from the approximate amplitude taper in 8*a;*
Figure 9A:
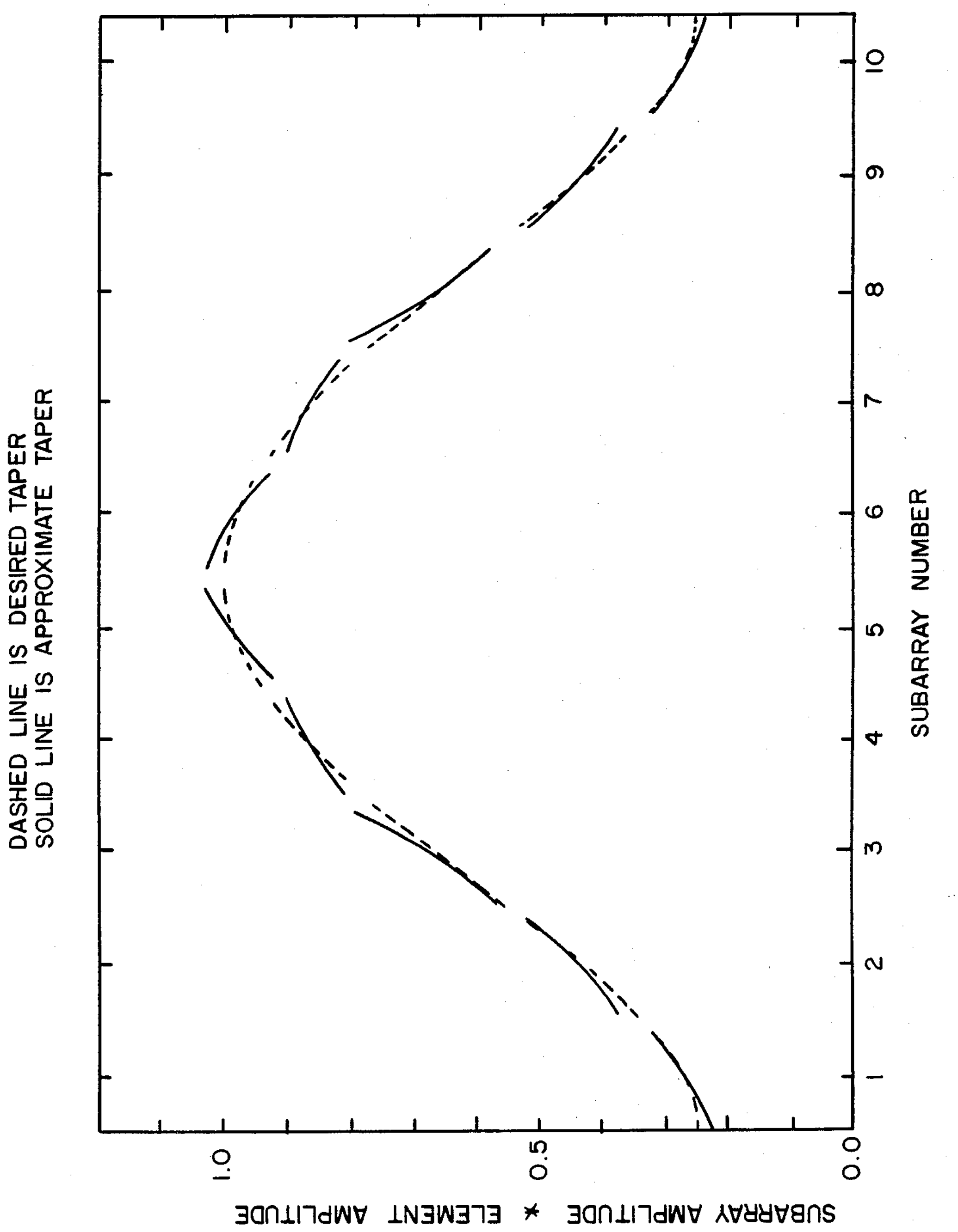
FIG. 9*a* is a graph of a 30 dB subarray amplitude with two groups of identical subarrays (subarrays 1 to 3, and 4 to 5)
Figure 9B:
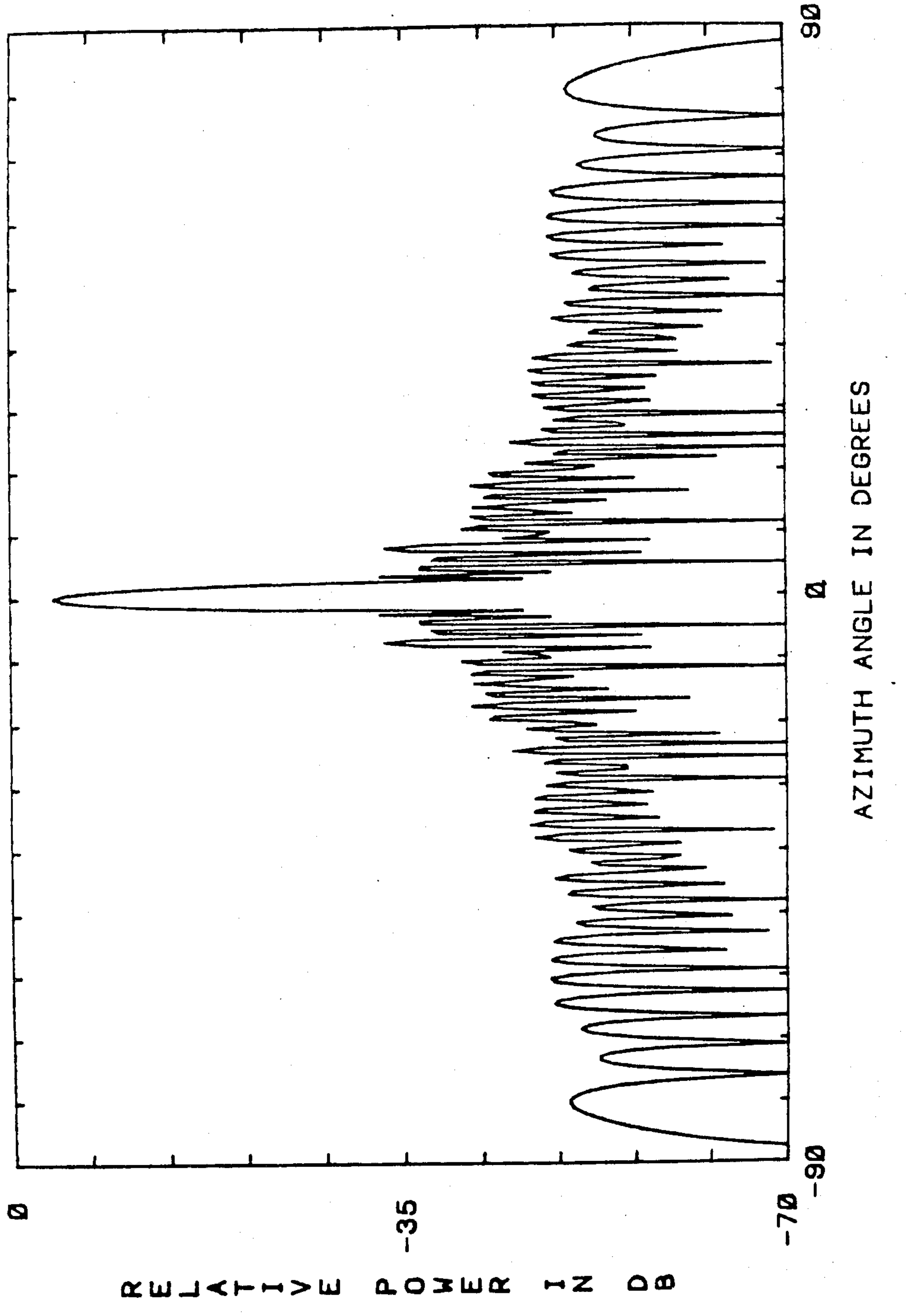
FIG. 9*b* is a graph of a far field pattern resulting from the approximate amplitude taper in 9*a;*
Figure 10A:
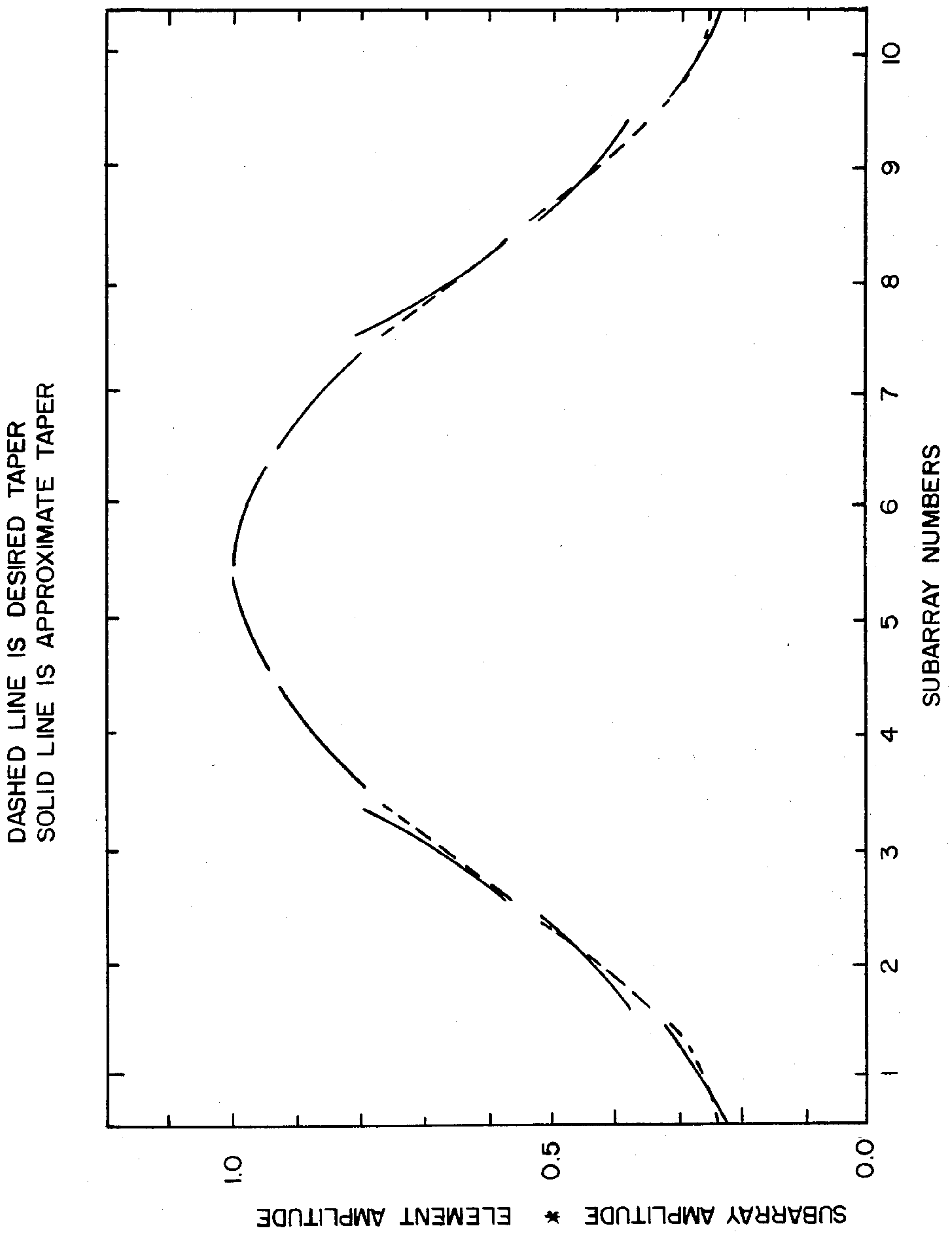
FIG. 10*a* is a graph of a 30 dB subarray amplitude with three groups of identical subarrays (subarrays 1 to 3, and 4 to 5)
Figure 10B:
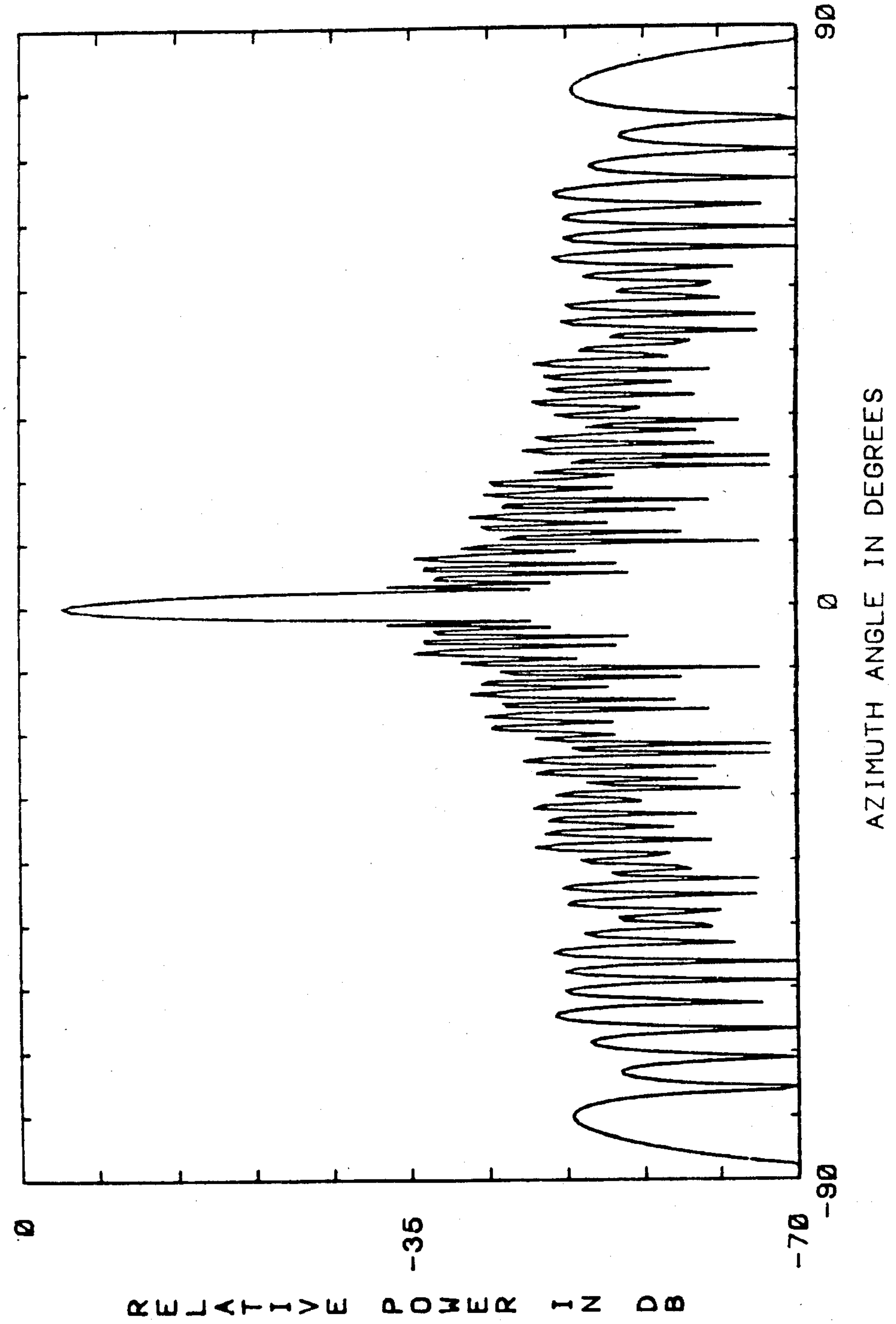
FIG. 10*b* is a graph of a far field pattern resulting from the approximate amplitude taper in 10*a;*

The techniques were then tried on a 70 element linear array with a 30 dB, n=4 Taylor amplitude distribution and 10 subarrays. FIGS. 8*a* and 8*b* show the approximation and far field pattern resulting from having all the subarrays identical. Next, the subarrays were divided into two groups of element amplitude tapers. The first group had subarrays 1 to 3 and the second group had subarrays 4 and 5. FIGS. 9*a* and 9*b* show the amplitude taper and resulting far field pattern respectively. Finally, subarrays 1 to 3 were placed in group 1, 4 was a group 2, and 5 was in group 3. This grouping produced excellent results (FIGS. 10*a* and 10*b*). Results for the 10 subarray case were similar to the results for the 14 subarray case. The more subarray groups, the better the amplitude taper approximation becomes, hence, the far field pattern comes closer to the desired far field pattern. In the limiting case of 70 subarrays, the approximation and desired tapers are the same.

Figure 11A:
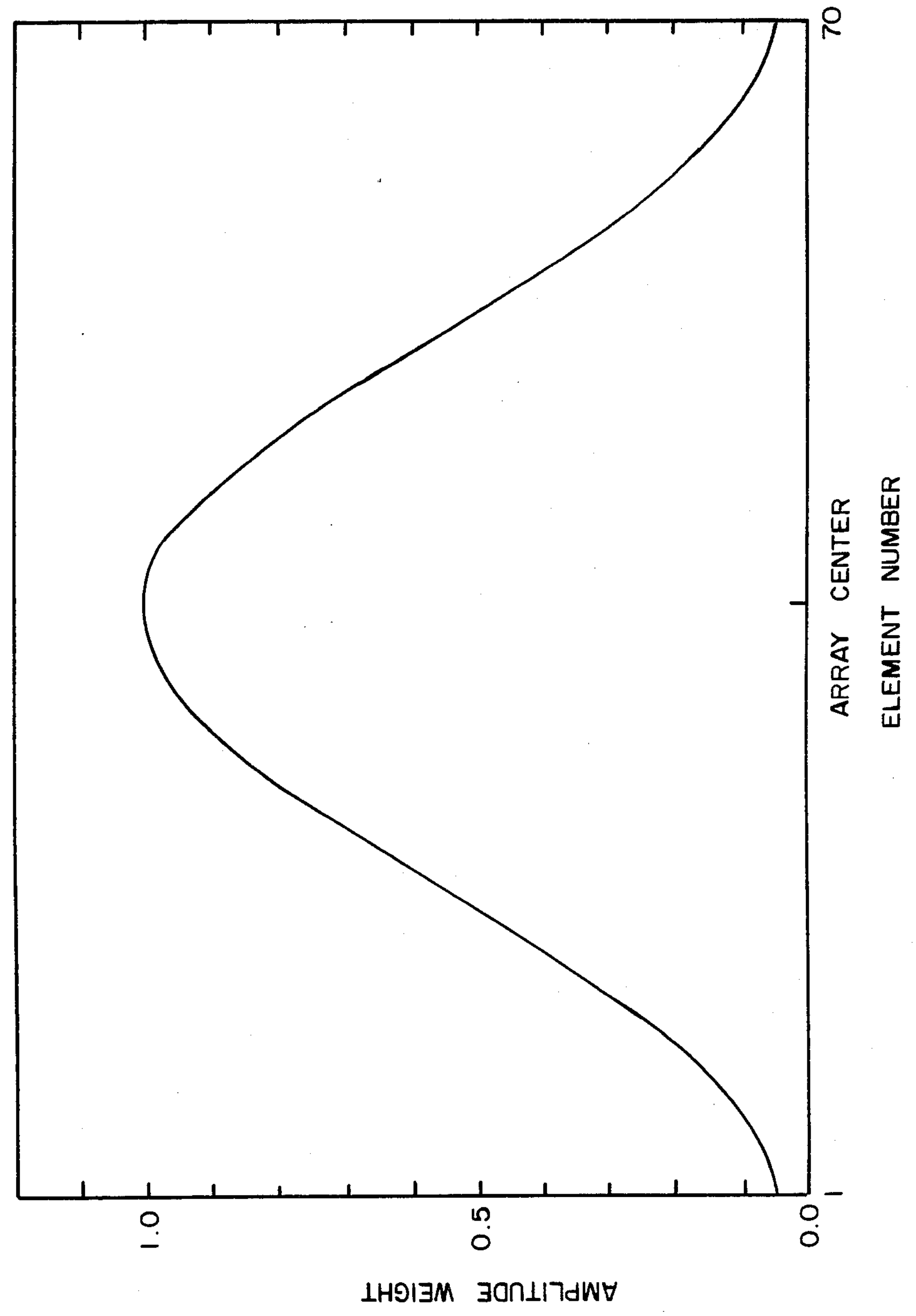
FIG. 11*a* is a graph of a 50 dB n=12 Taylor amplitude taper.
Figure 11B:
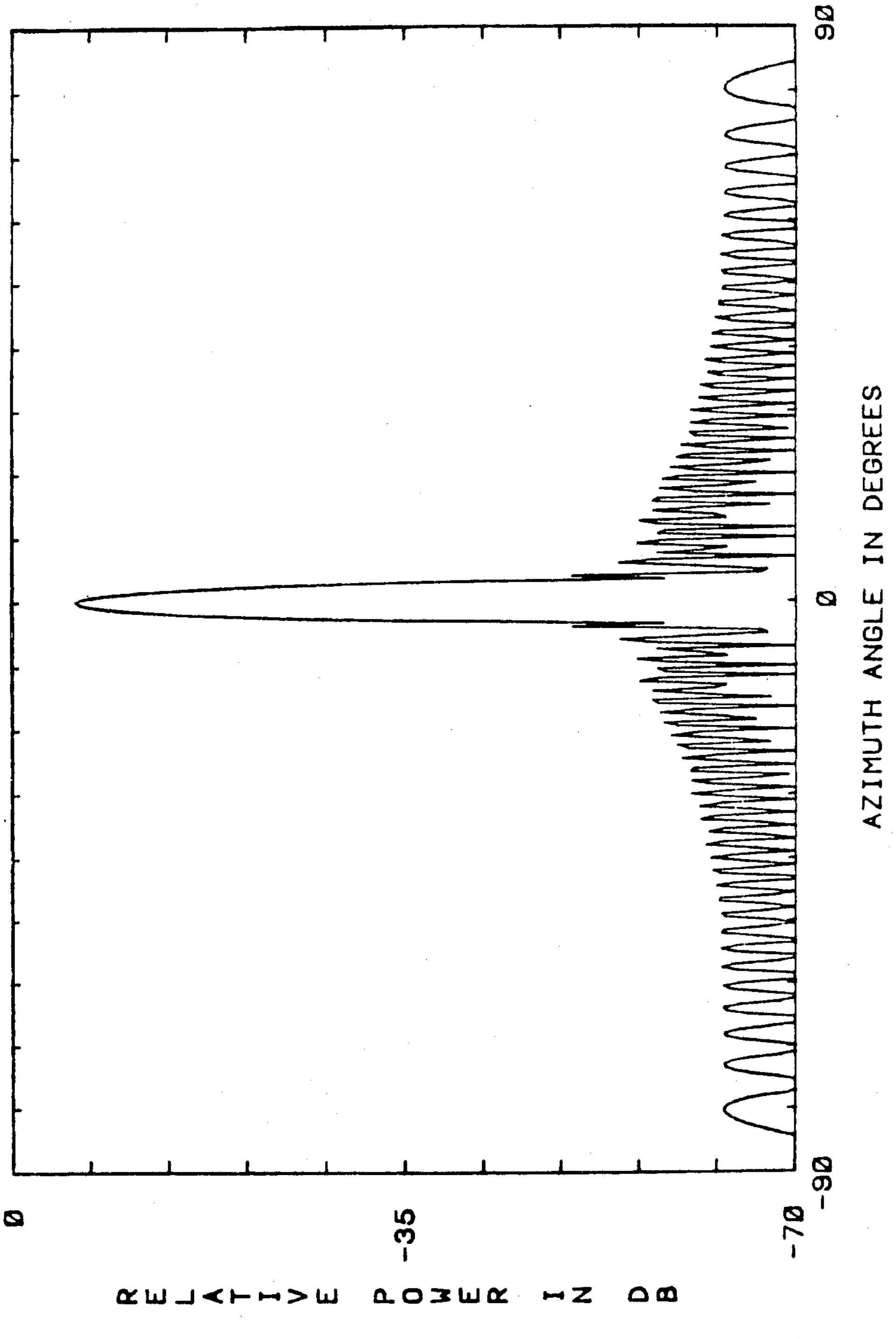
FIG. 11*b* is a graph of a far field pattern of a 70 element array with a 50 dB n=12 Taylor amplitude taper.
Figure 12A:
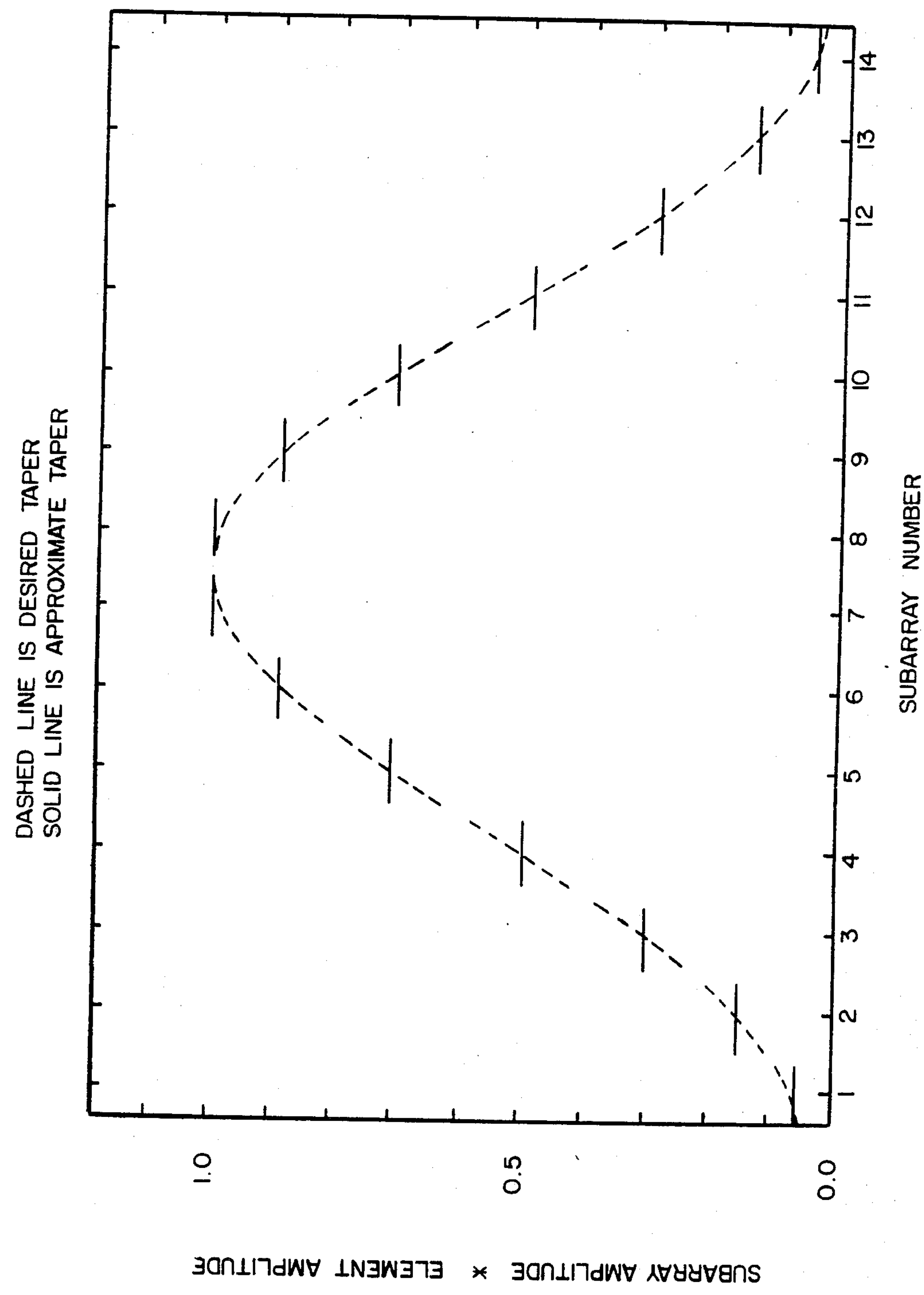
FIG. 12*a* is an effective element amplitude distribution due to a 50 dB Taylor amplitude tape applied at the outputs of 14 subarrays.
Figure 12B:
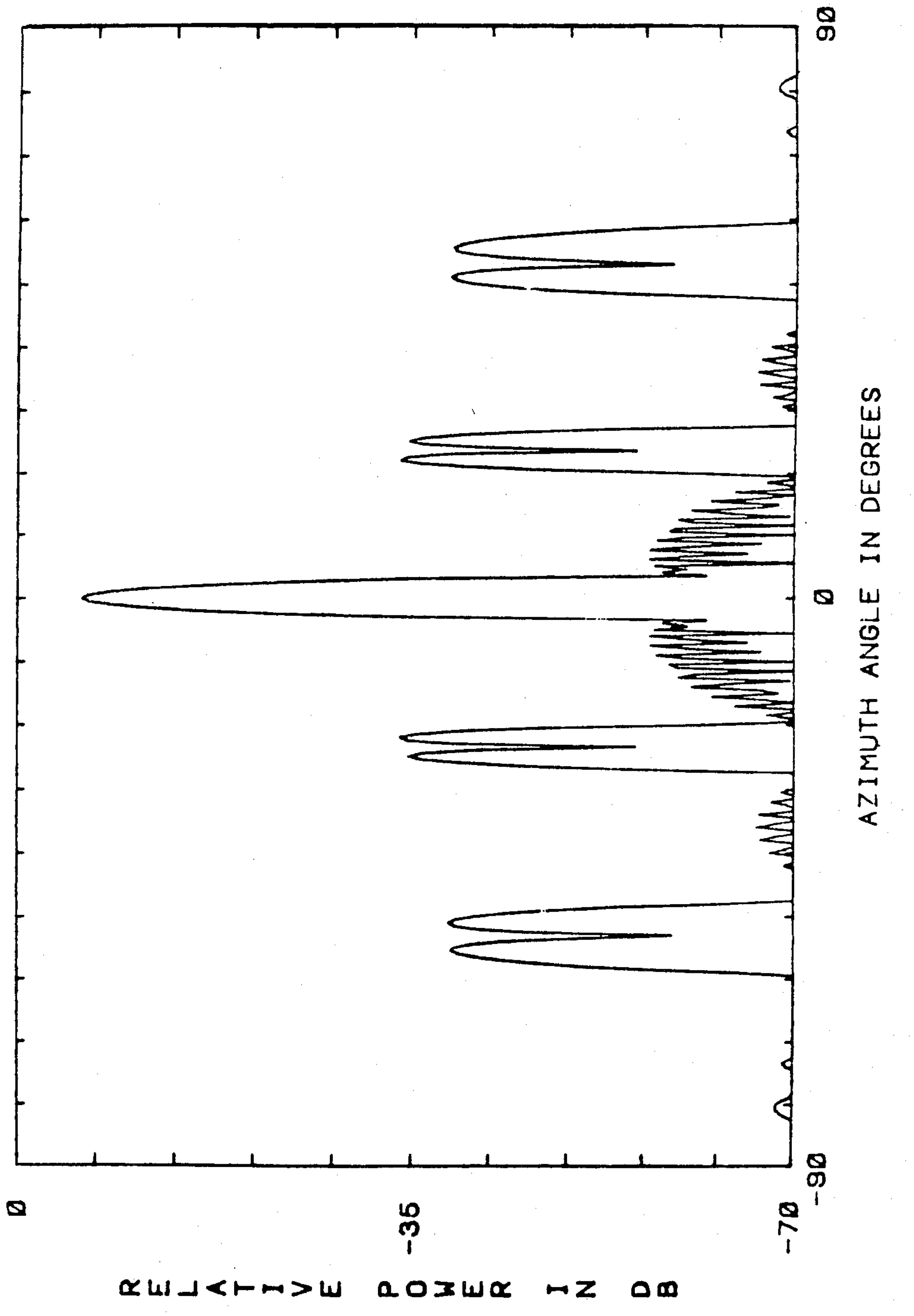
FIG. 12*b* is a graph of a far field pattern resulting from the approximate amplitude taper in 12*a;*

One might expect that subarray amplitude tapering becomes more of a problem as sidelobe levels get lower. Equation (2) and (3) quickly verify this suspicion. Equation (2) does not depend upon the aperture amplitude tapers at all. Thus, the grating lobes always appear at the same locations, independent of the sidelobe levels. On the other hand, the grating lobe peaks do depend upon the amplitude taper. Equation (3) shows that the peaks are directly proportional to the beam broadening factor, B. In turn, B gets larger as the sidelobe levels get lower. Although B does change with sidelobe level, the change is relatively small. For instance B=1.25 for the 30 dB Taylor taper and B=1.50 for the 50 dB Taylor taper. This change results in an increase in grating lobe height of 1.59 dB for the 50 dB taper. FIGS. 11a and 11b show the amplitude taper and associated far field pattern of a 50 dB, n=12 low sidelobe Taylor distribution. The next two figures (FIGS. 12a and 12b) show the results of placing the amplitude taper at the subarray outputs for 14 subarrays. As previously predicted, the grating lobe locations are the same as the 30 dB Taylor far field pattern. Grating lobe peaks are slightly higher in the 50 dB Talor taper.

Figure 13A:
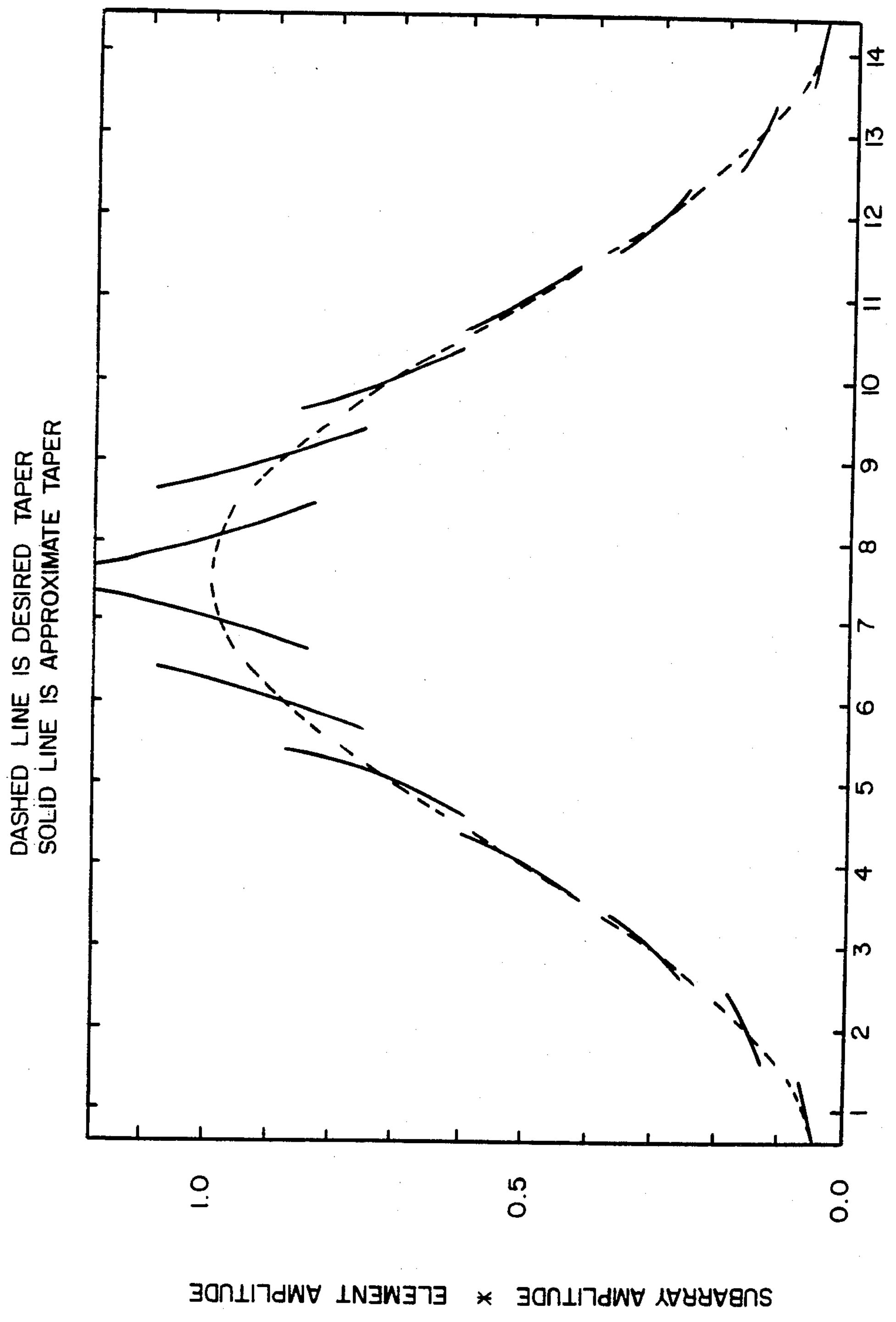
FIG. 13*a* is a graph of a 50 dB subarray amplitude taper with identical element amplitude tapers in each of the 14 subarrays.
Figure 13B:
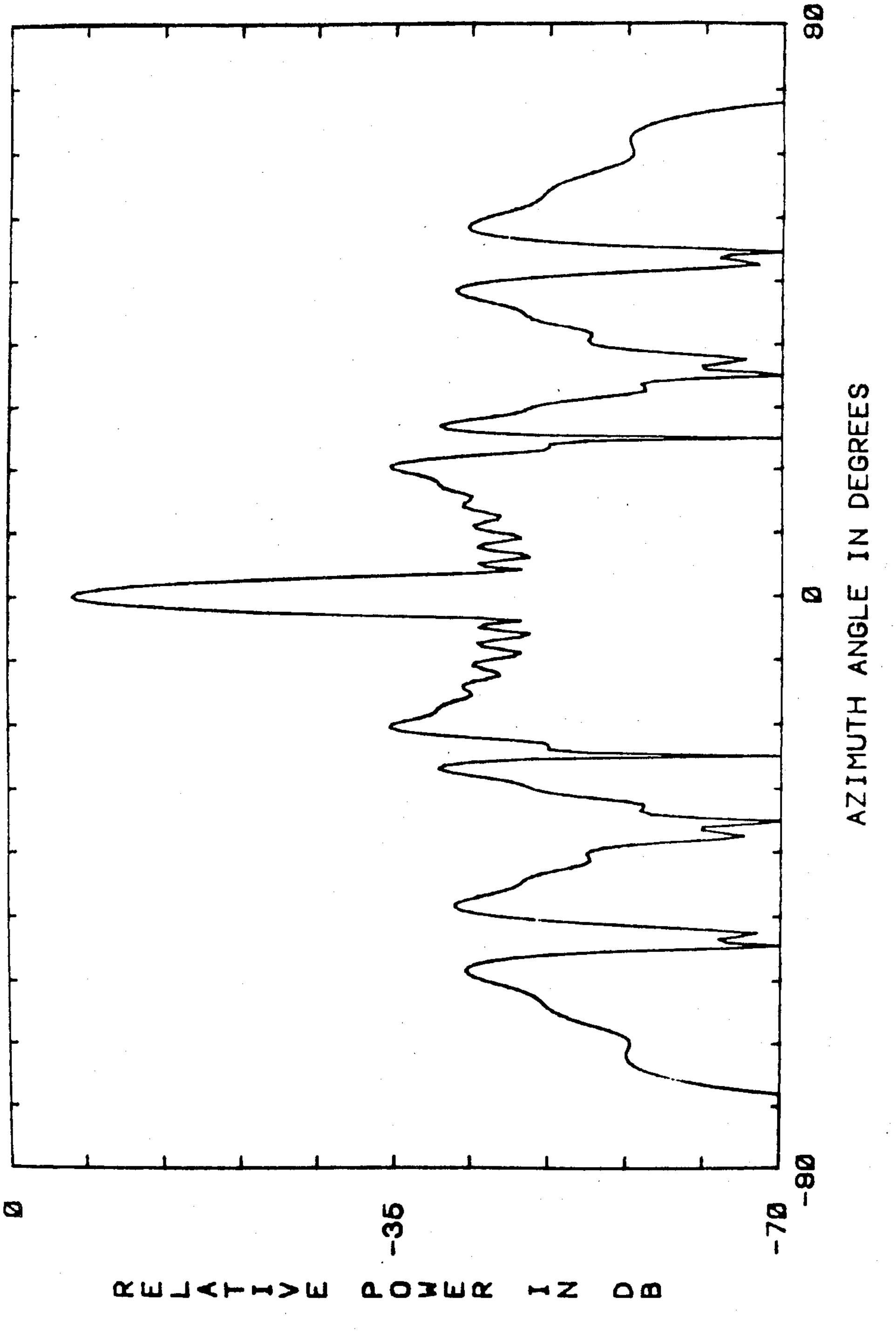
FIG. 13*b* is a graph of a far field pattern resulting from the approximate amplitude taper in 13*a;*
Figure 14A:
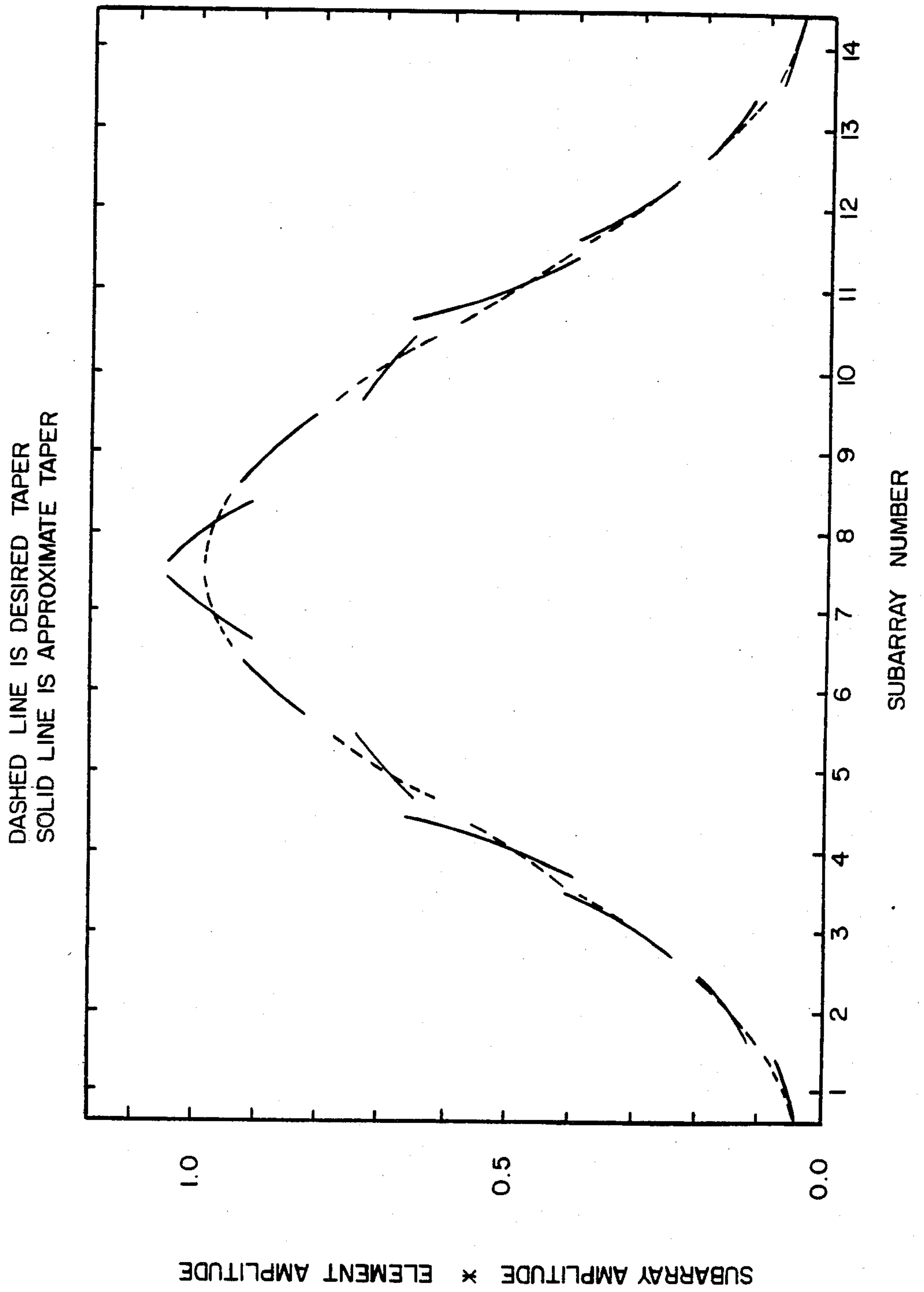
FIG. 14*a* is a graph of a 50 dB subarray amplitude taper with two groups of identical subarrays (subarrays 1 to 4, and 5 to 7)
Figure 14B:
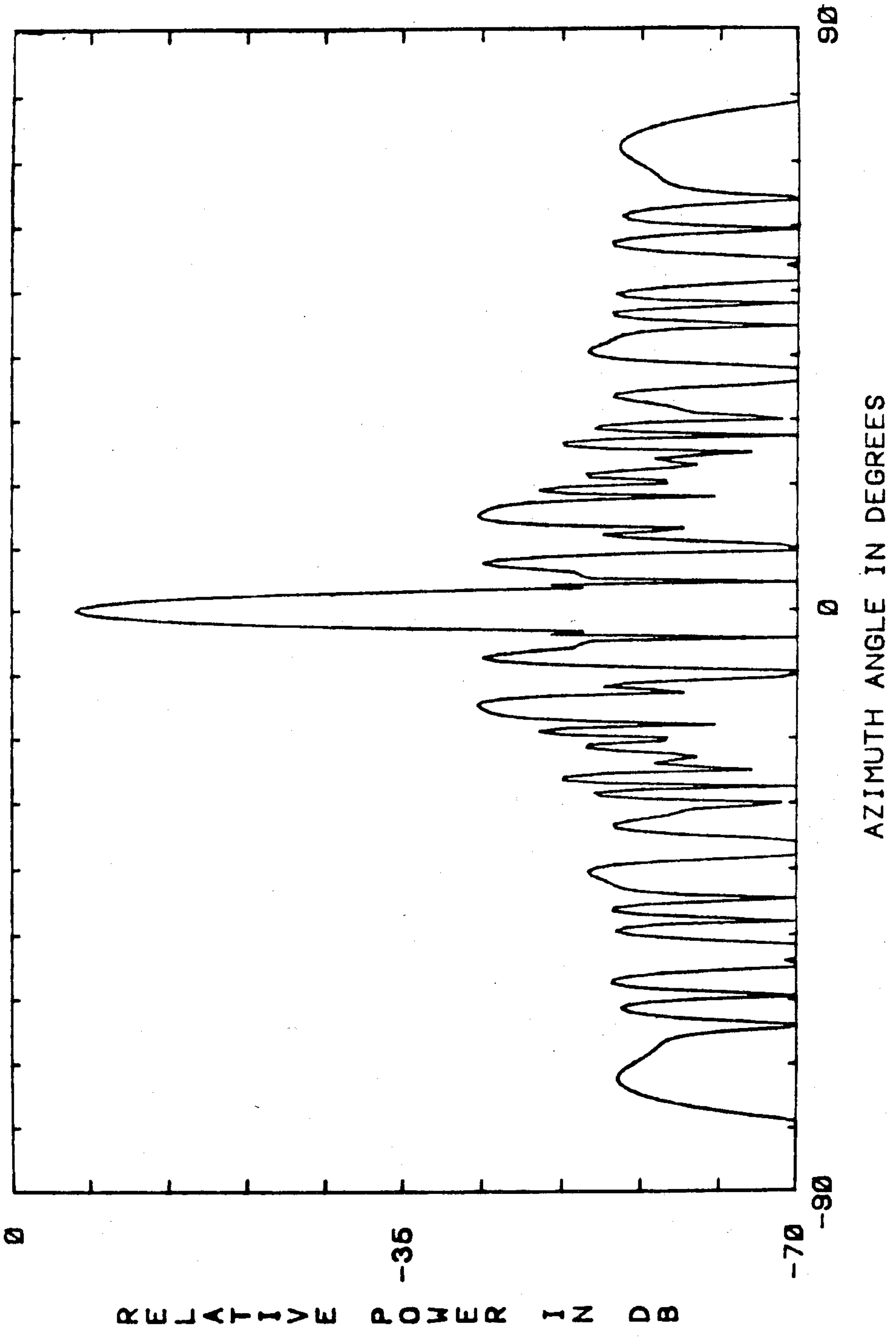
FIG. 14*b* is a graph of a far field pattern resulting from the approximate amplitude taper in 14*a;*
Figure 15A:
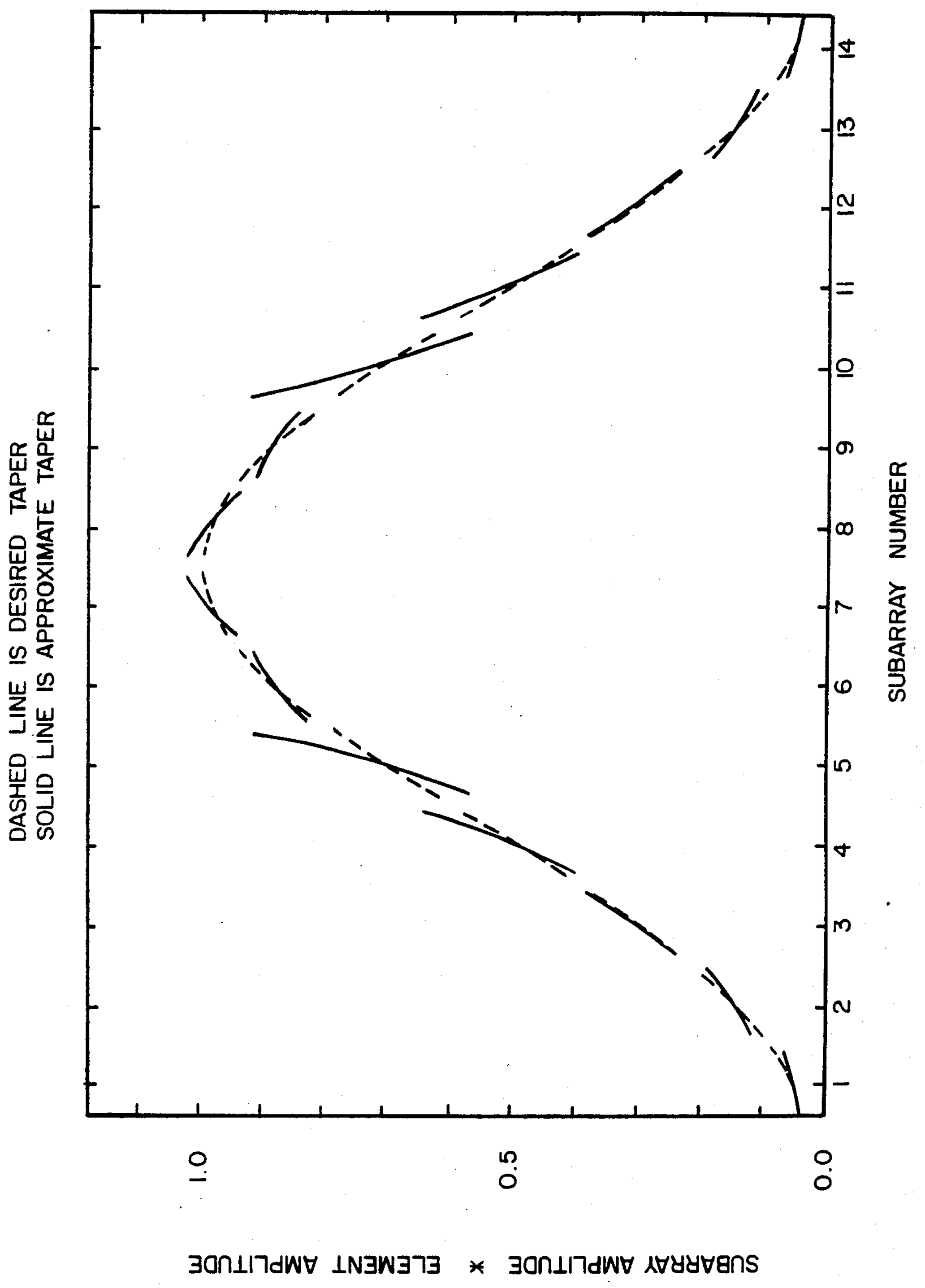
FIG. 15*a* is a graph of a 50 dB subarray amplitude taper with two groups of identical subarrays (subarrays 1 to 4 and 5 to 7)
Figure 15B:
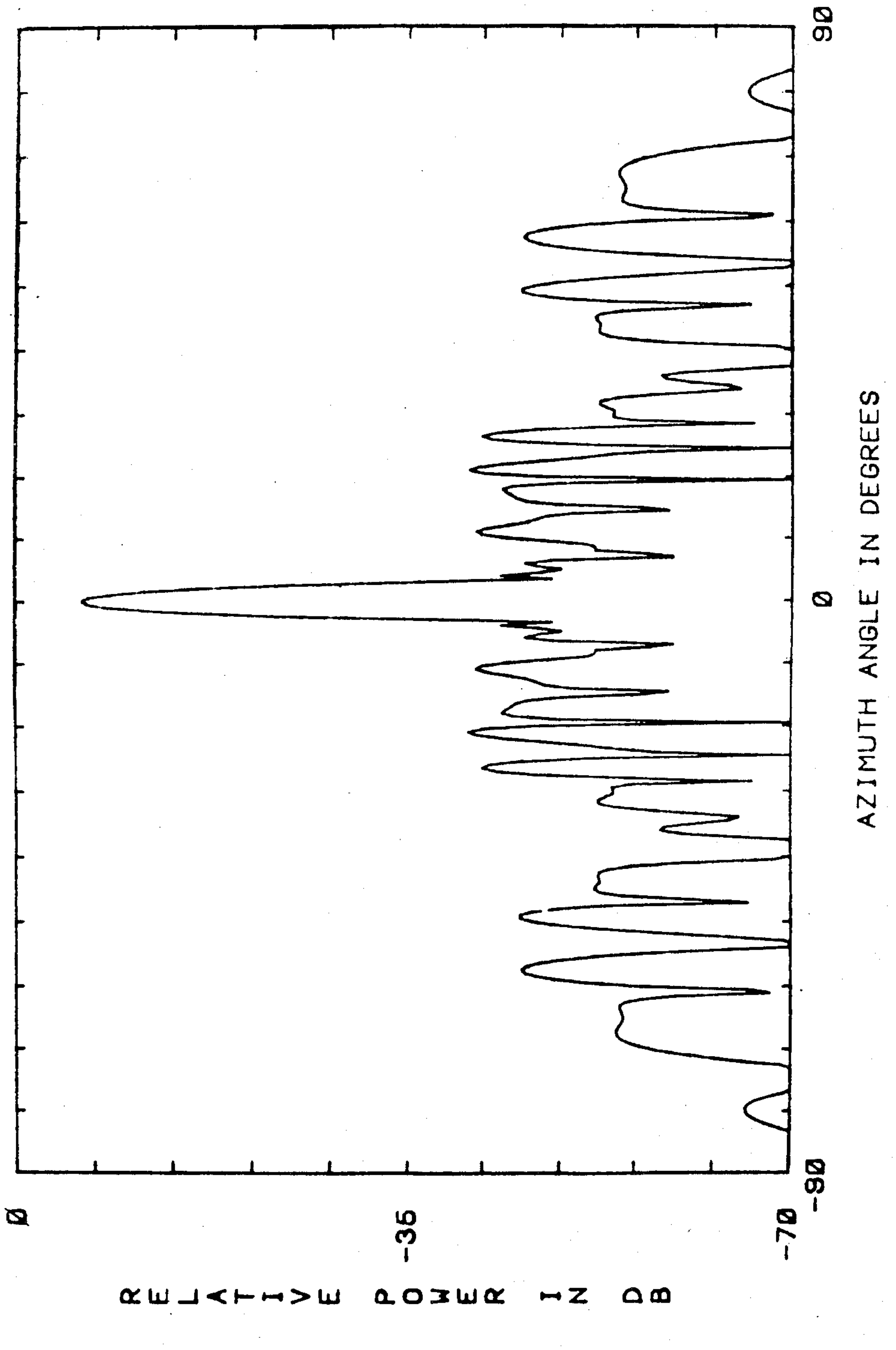
FIG. 15*b* is a graph of a far field pattern resulting from the approximate amplitude taper in 15*a;*
Figure 16A:
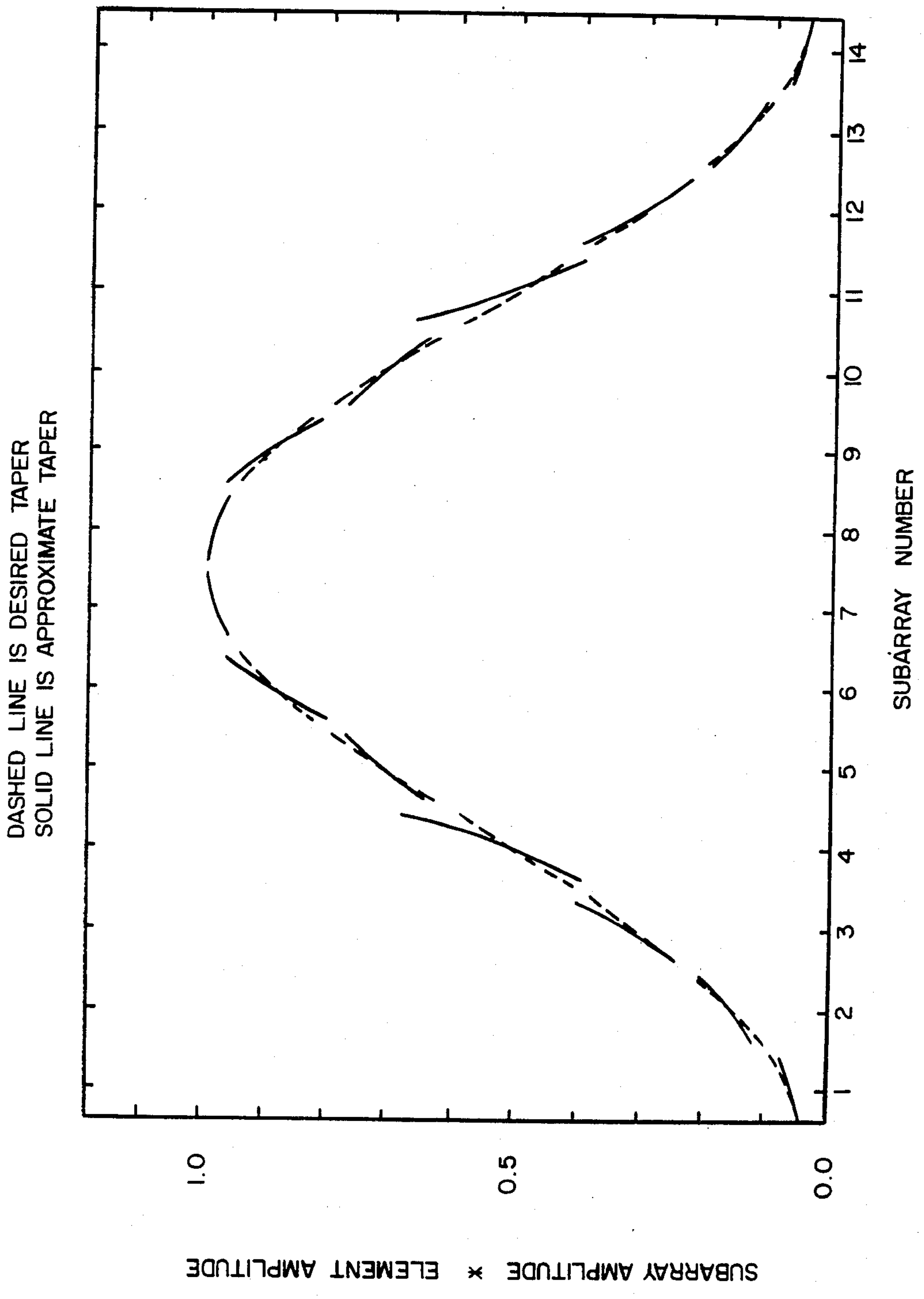
FIG. 16*a* is a graph of a 50 dB subarray amplitude taper with three groups of identical subarrays (subarrays 1 to 4, 5, 6 to 7)
Figure 16B:
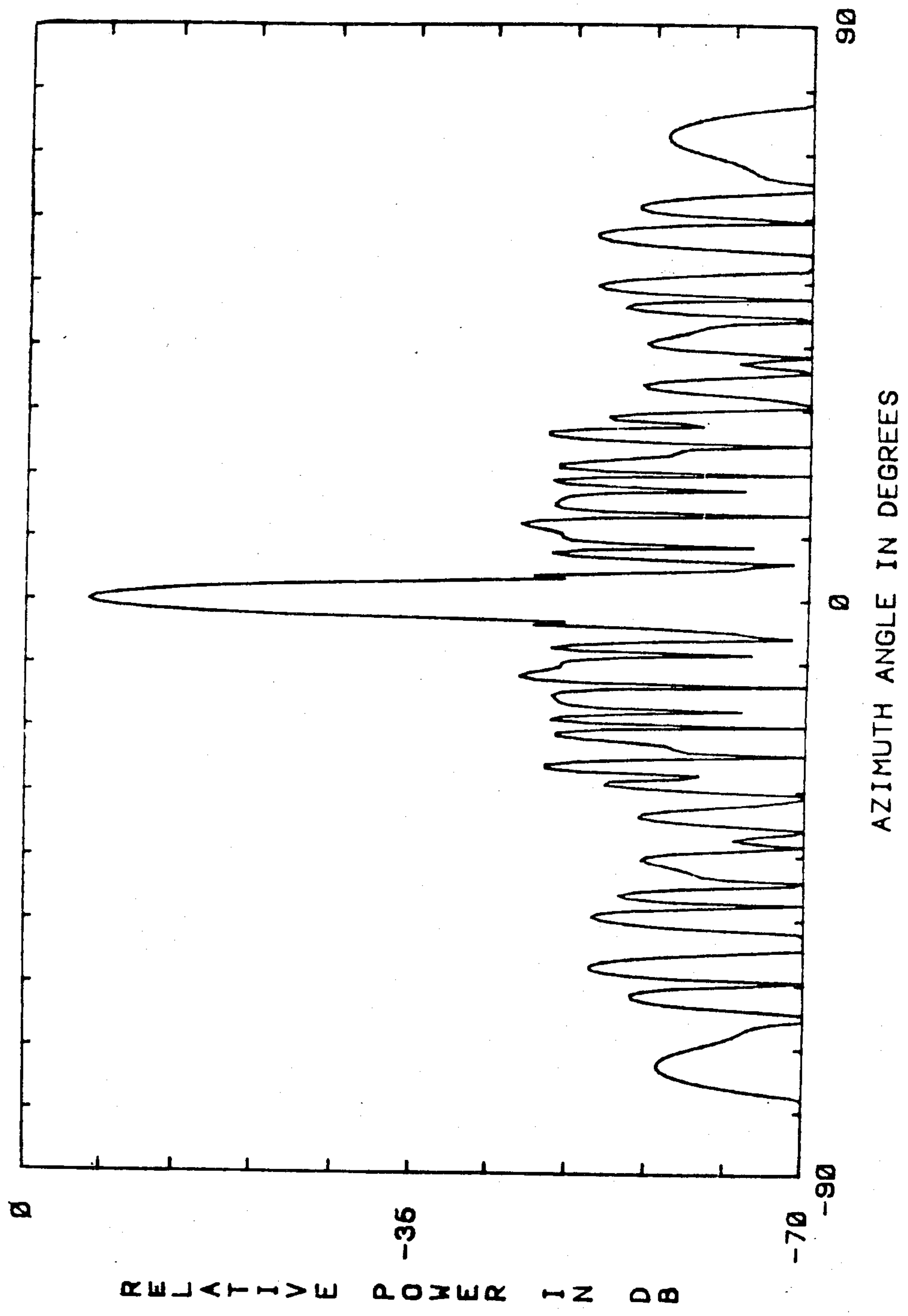
FIG. 16*b* is a graph of a far field pattern resulting from the approximate amplitude taper in 16*a;*
Figure 17A:
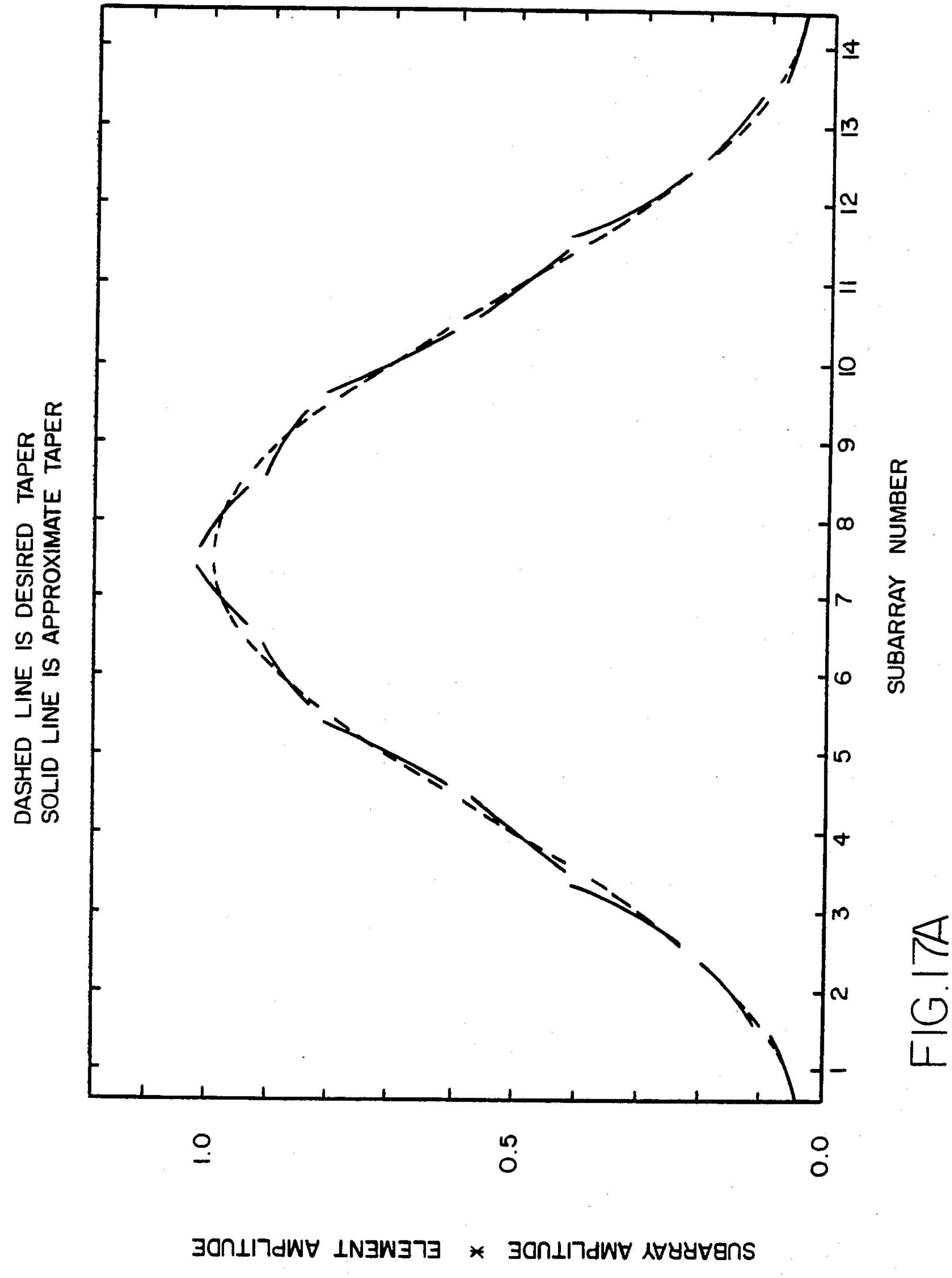
FIG. 17*a* is a graph of a 50 dB subarray amplitude taper with three groups of identical subarrays (subarrays 1 to 3, 4 to 5,6 to 7)
Figure 17B:
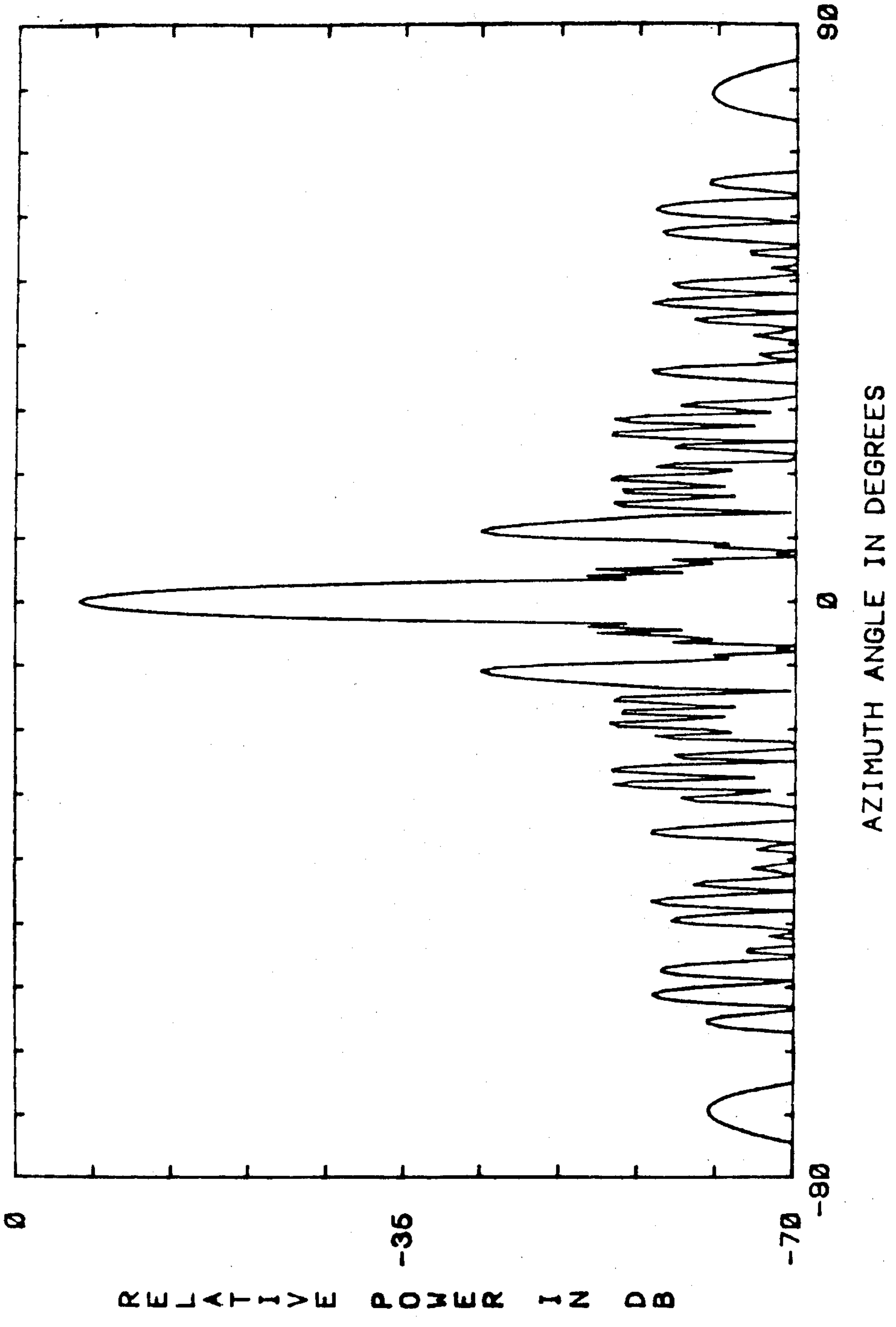
FIG. 17*b* is a graph of a far field pattern resulting from the approximate amplitude taper in 17*a;*
Figure 18A:
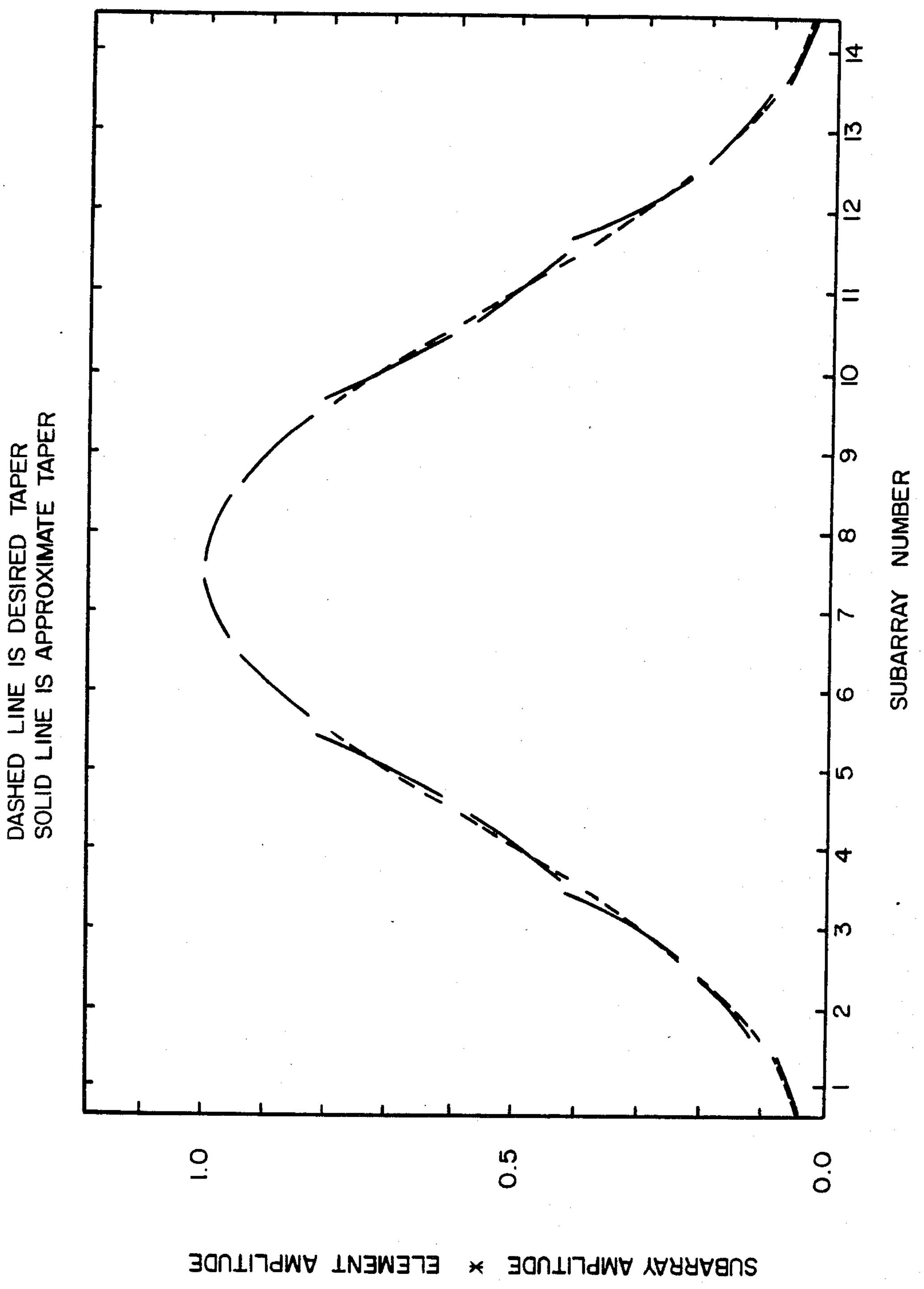
FIG. 18*a* is a graph of a 50 dB subarray amplitude taper with four groups of identical subarrays (subarrays 1 to 3, 4 to 5,6 to 7)
Figure 18B:
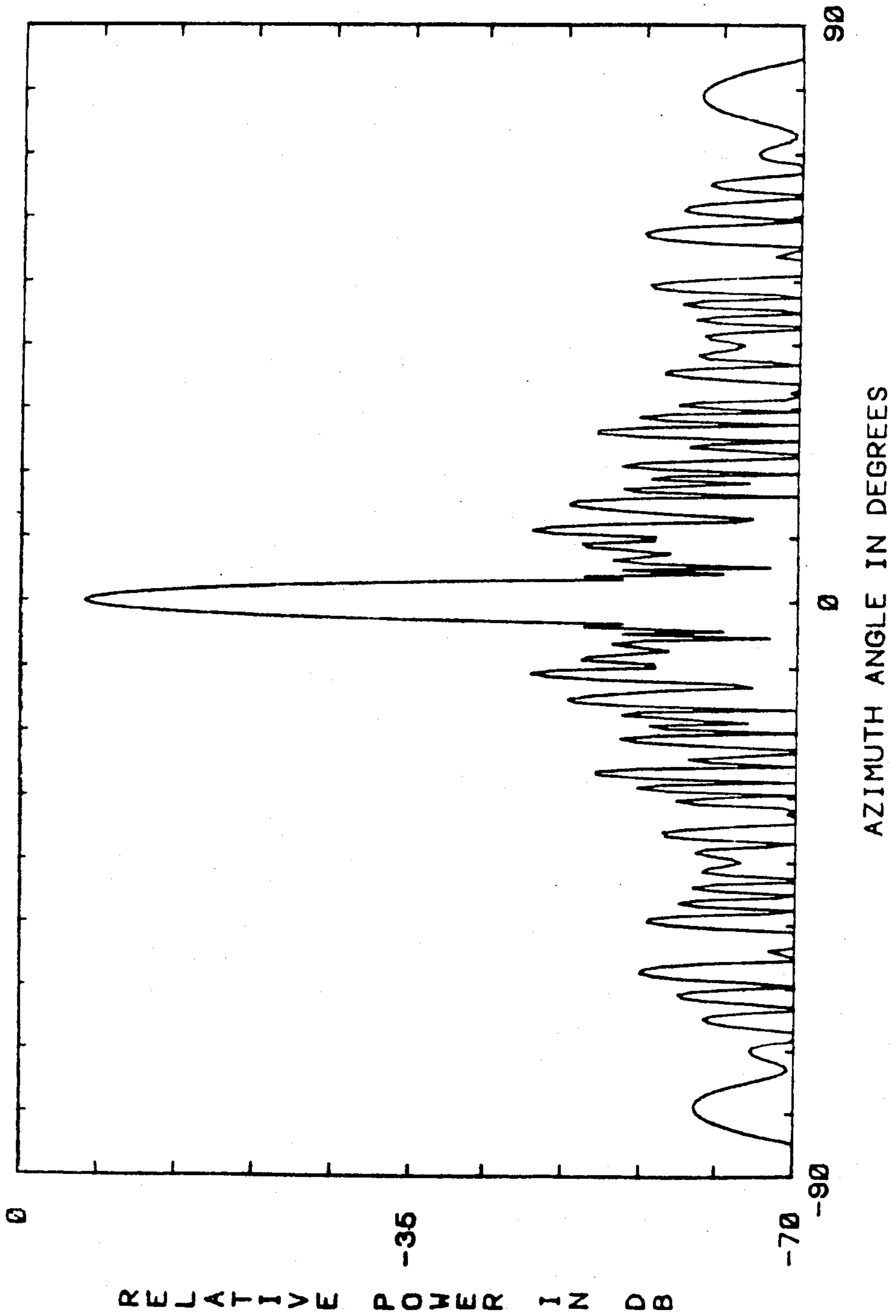
FIG. 18*b* is a graph of a far field pattern resulting from the approximate amplitude taper in 18*a;*

FIGS. 13a and 13b show different approximations to the 50 dB Taylor amplitude distribution for 14 subarrays. The 50 dB sidelobe levels are quite sensitive to the accuracy of the approximation. FIGS. 13a and 13b clearly show this inadequacy of the approximation when all the subarrays have identical element amplitude tapers. The accuracy of the approximation improves when 2 or 3 different groups of subarrays having identical elements amplitude tapers are found (FIGS. 14a–17b). However, the approximation is not good enough until 4 different groups of subarrays are formed (FIGS. 18a and 18b).

Figure 19A:
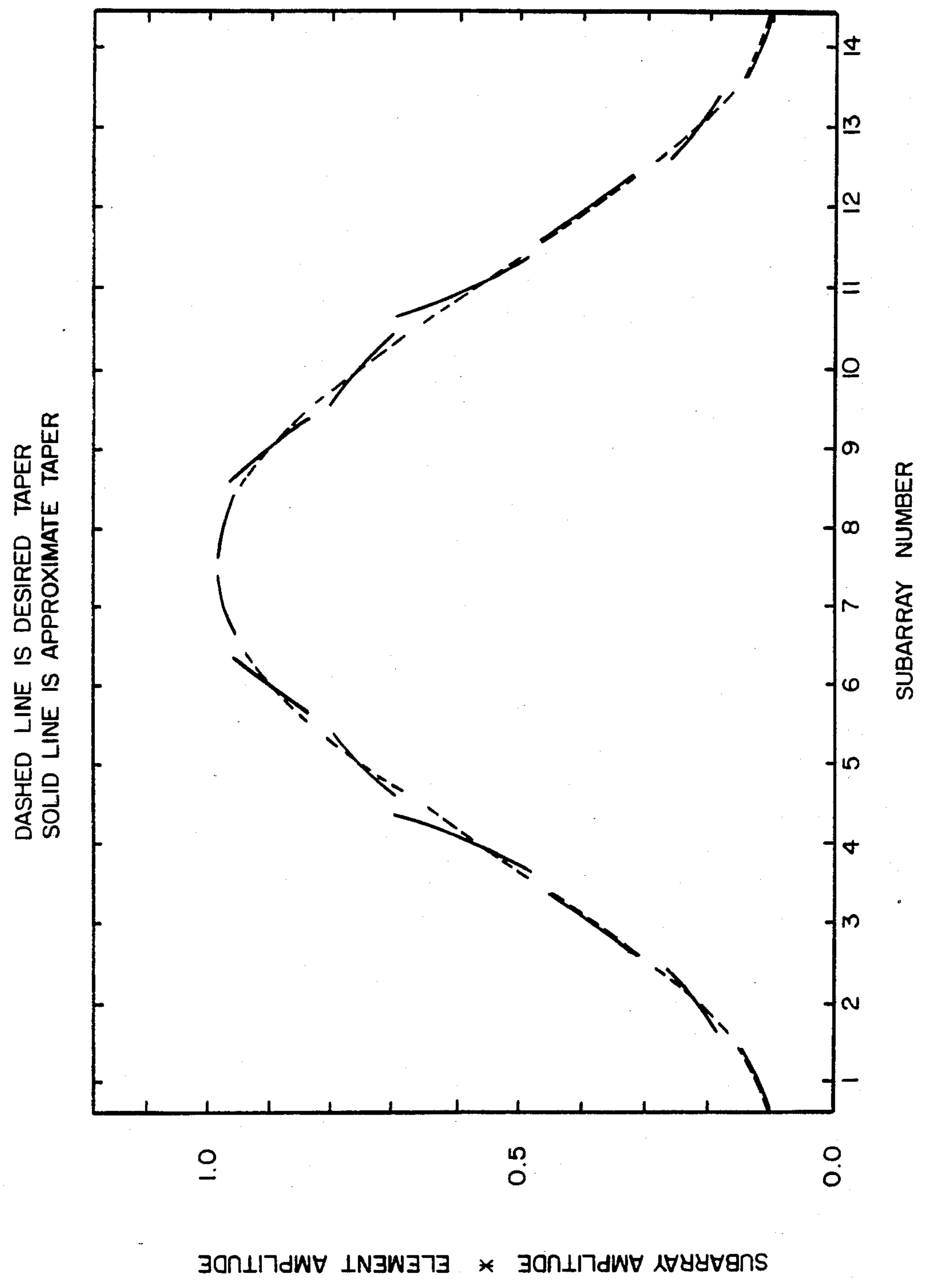
FIG. 19*a* is a graph of a 40 dB subarray amplitude taper with three groups of identical subarrays (subarrays 1 to 4, 5,6 to 7)
Figure 19B:
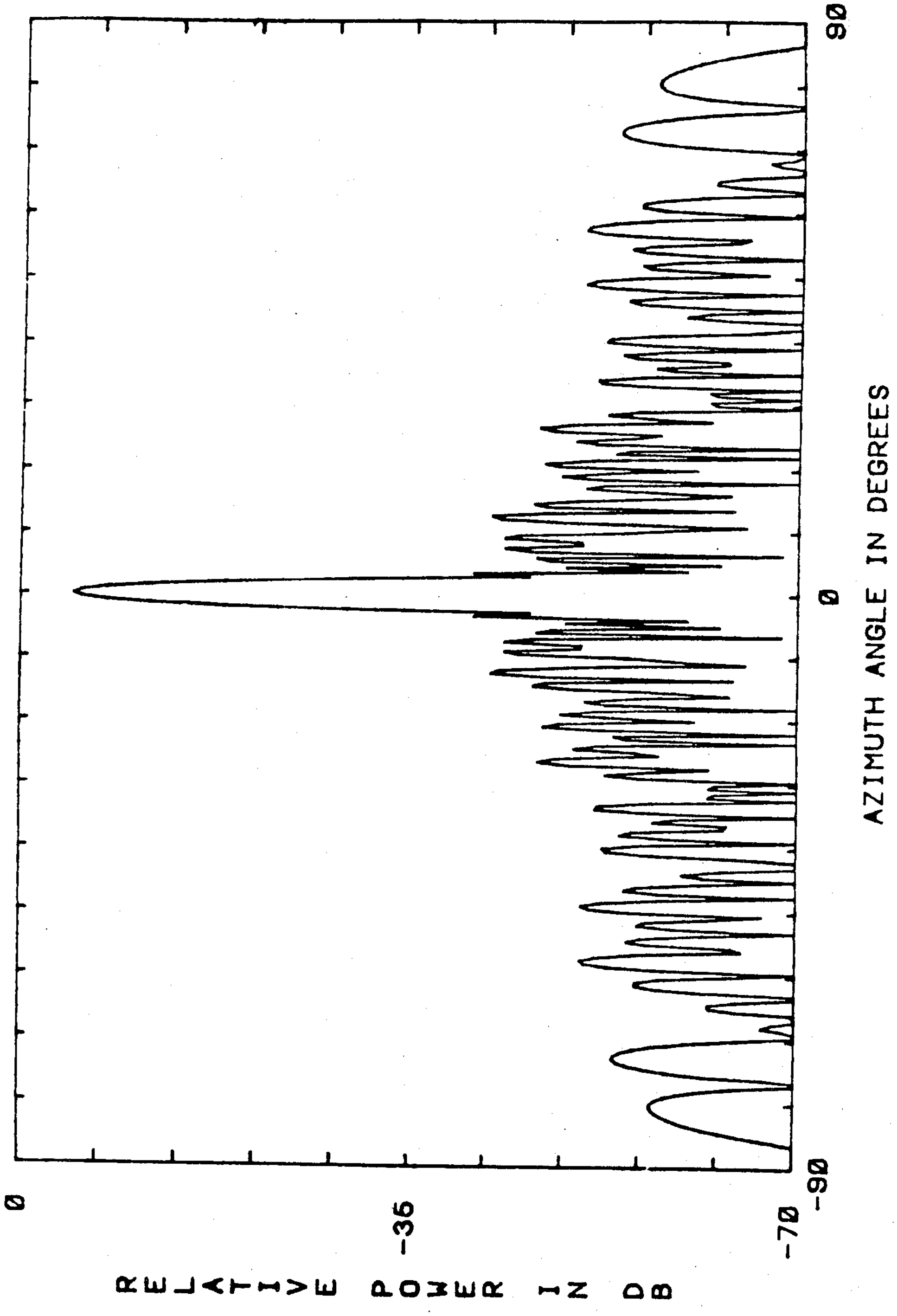

Finally, FIGS. 19a and 19b show the approximate amplitude taper and associated far field pattern for a 40 dB Taylor amplitide taper. The Taylor distribution was approximated by three groups of identical subarrays (subarrays 1 to 4:5 and 6; and 7). This approximation produced an excellent far field pattern.

Figure 20:
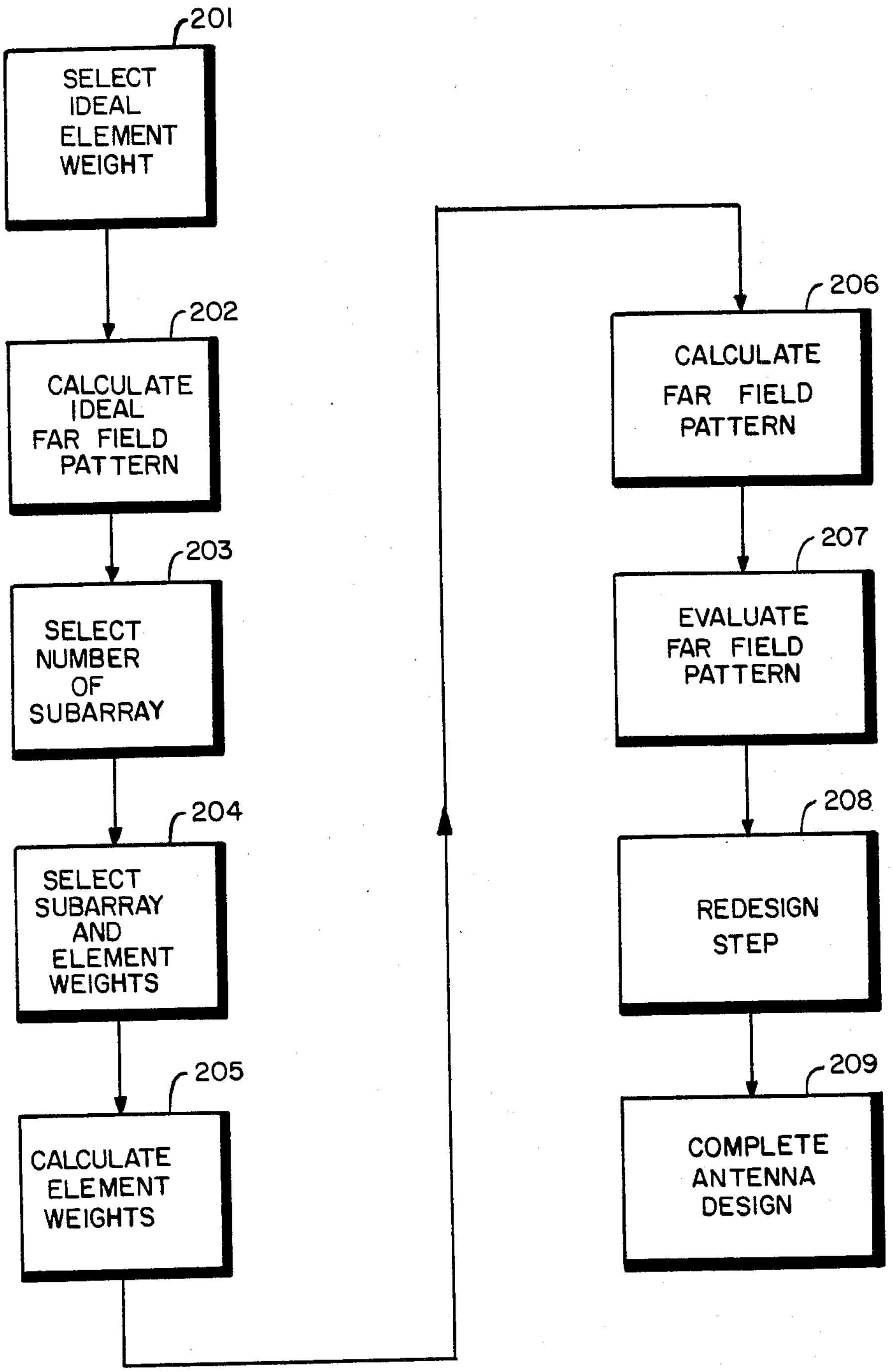
* and FIG. 20 is a block diagram of the process of the present invention.

FIG. 20 is a block diagram of the process of the present invention. There exists three embodiments of this process, which are used to design phased array antenna systems and reduce the grating lobes, which occur due to the subarray amplitude tapering. The first process begins with a first selecting step 201 in which an ideal exact element amplitude taper for all the individual elements in the phased array antenna is selected. This ideal exact element amplitude taper is a distribution of amplitude weights which, if distributed over the plurality of antenna elements, would result in an "ideal" far field antenna pattern with low sidelobes. The first selecting step 201 may be a selection of a distribution for the ideal exact element amplitude weights from a group of distribution including: Taylor, Chebychev, triangular and cosine distributions.

Next in the process is a first calculating step 202 in which the "ideal" far field antenna pattern resulting from use of said ideal exact element amplitude taper is calculated using the equations described earlier. The far field pattern is best expressed in a figure such as FIG. 2b.

The process continues with a second selecting step 203 in which the number subarrays m, each containing n elements, is selected such that the product of $(m)\times(n)$ equals N, and N equals the total number of antenna elements in the phased array antenna.

This is followed by a third selecting step 204 in which a set of subarray amplitude weights $(b_m)$ is selected for each of the m subarrays and a set of individual element weights $(a_{mn})$ is selected for each of the N antenna elements in the phased array antenna such that the product of $(b_m)\times(a_{mn})$ approximately equals $A_{(mn)}$, where $A_{(mn)}$ equals the value of the ideal exact amplitude taper for each of the individual antenna elements selected in the first selecting step. Note that the set of subarray weights $(b_m)$ is actually planned to be used in the design, but the individual element weights $(A_{mn})$ and $(a_{mn})$ are only used for calculation purposes.

Next, there is a second calculating 205 step, in which a calculation is made for a value for a set of actual element amplitude weights such that each nth actual element amplitude weight is identical for corresponding elements in an identical subarray, and is given by a set $a'_{(mn)}$ where each nth element amplitude weight in the set $a'_{(mn)}$ is obtained by averaging the value of each corresponding nth element amplitude of the set of individual element weight $a_{(mn)}$ selected in the third selecting step.

This is followed by a third calculating step 206 in which a far field antenna pattern resulting from the effective amplitude taper of the set of subarray amplitude weights $(b_m)$ and the actual amplitude weights $a'_{(mn)}$ is calculated using the equations described earlier. This far field pattern is best expressed as a figure such as FIG. 5b.

The process continues with an evaluation step 207 in which a comparison is made between the far field antenna pattern from the third calculation step 206, and the far field antenna pattern of this first calculation step 202. This evaluation step 207 is performed after the third calculating step and indicates that the antenna design completion step should be accomlished when both of the far field antenna patterns favorably compare with satisfactory sidelobes.

There is a redesign step 208 which entails repeating, in order, the second and third selecting steps, the second calculation step 205, and the evaluation step 207 when both of the far field antenna patterns do not favorably compare in the evaluation step 207, and when the second selecting step 203 is repeated, increasing the number of subarrays selected (m) while decreasing the number of elements per subarray (n) while maintaining the product relationship $(m)\times(n)=N$. This redesign step 208 is repeated until a favorable comparison between far field antenna patterns occurs in the evaluation step 207.

The first embodiment concludes with an antenna design completion step 209, which designs the antenna, as described for FIG. 1, to include the set of subarray amplitude weights $a'_{(mn)}$ obtained in the second calculation step 205 to produce a configuration that reduces the grating lobes in the far field antenna pattern caused by the subarray amplitude tapering while simplifying the phased array antenna's design by designating groups of identical subarrays.

The antenna design completion step 209 can be described in terms of the following subsets:

dividing the phased array into m identical subarrays of n elements, m or n being integers obtained in the second selection step, each of the antenna elements being electrically connected by a phase shifter to a functional element amplitude weight which produces an output signal by adjusting amplitudes of signals to and from its respective antenna element; then assigning the values for the set of actual element amplitude weights $a'_{(mn)}$ obtained in the second calculating step 205 to the functional element amplitude weights in the subarrays, such that groups of identical subarrays of n elements have identical functional element amplitude weights between the nth corresponding element; then indicating a presence of m subarray ports, m subarray weights and m subarray time delays, each of the m subarray ports producing an output signal by receiving and summing signals from all functional element amplitude weights contained in its respective subarray, each of m subarray weights having assigned a value obtained in the third selecting step, each of the subarray weights producing an output signal by amplitude weighting signals received its respective subarray port, each of the subarray time delays producing an output signal by delaying signals received from its respective subarray amplitude weight; and noting the presence of the array output port which produces an output signal by receiving and summing all signals obtained from each of the subarray time delays.

The second and third embodiments of the process of the present invention follow the block diagram of FIG. 20, but differ in the details of the redesign step 208. This second embodiment's redesign step 208 does entail repeating, in order, the second and third selecting steps, the second calculation step 205, and the evaluation step when both of the far field antenna patterns do not favorably compare in the evaluation step 207. However, when the second selecting step is repeated, it entails identifying one additional group of identical subarrays within the phased array antenna rather than have all the subarrays being identical, so that the phased array antenna will be composed of groups of identical subarrays with each subarray being identical with the others in its group. This redesign step is repeated until a favorable comparison between far field antenna patterns occurs in the evaluation step 207.

After selecting a group of identical subarrays, the calculation step and far field pattern estimation step is repeated to determine if the sidelobe pattern acceptably approaches that product by the exact element tapering selected in the first step. The second correction step is then repeated until an acceptable far field antenna pattern is obtained.

Note that in a third embodiment of the present invention, the redesign step 208 can combine the features of the redesign steps in the first and second embodiments described above to improve the sidelobe levels in the far field antenna pattern.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. In combination with a phased array antenna containing a plurality of antenna elements which may be divided up into groups called subarrays, with each subarray producing an output signal which receives a subarray amplitude tapering before being summed into an array output signal, a process of reducing grating lobes in a far field antenna pattern of said phased array antenna, said grating lobes being caused by said subarray amplitude tapering, said process comprising the steps of:

a first selecting step in which an ideal exact element amplitude taper for all the individual elements in the phased array antenna is selected, said ideal exact element amplitude taper being a distribution of amplitude weights which, if distributed over the plurality of antenna elements, would result in an ideal far field antenna pattern with low sidelobes;

a first calculating step in which the ideal far field antenna pattern resulting from use of said ideal exact element amplitude taper is calculated;

a second selecting step in which the number of subarrays m, each containing n elements, is selected such that the product of $(m)\times(n)$ equals N, and N equals the total number of antenna elements in the phased array antenna;

a third selecting step in which a set of subarray amplitude weights $(b_m)$ is selected for each of said m subarrays and a set of individual element weights $(a_{mn})$ is selected for each of the N antenna elements in the phased array antenna such that the product of $(b_m)\times(a_{mn})$ approximately equals $A_{(mn)}$ where $A_{(mn)}$ equals the value of the ideal exact element amplitude taper for each of the individual antenna elements selected in the first selecting step;

a second calculating step, in which a calculation is made for a value, a set of actual element amplitude weights, such that each nth actual element amplitude weight is identical for corresponding elements in an identical subarray and is given by a set $a'_{(mn)}$ where each nth element amplitude weight in the set $a'_{(mn)}$ is obtained by averaging the value of each corresponding nth element amplitude of said set of individual element weights $a_{(mn)}$ selected in said third selecting step; and an antenna design completion step which adjusts said phased array antenna's design to include the set of subarray amplitude weights $(b_m)$ and actual element amplitude weights $a'_{(mn)}$ obtained in said second calculating step to produce a configuration that reduces the gating lobes in the far field antenna pattern caused by the subarray amplitude tapering while simplifying said phased array antenna's design by containing groups of identical subarrays.

2. A process, as defined in claim 1, in which the antenna design completion step comprises the following substeps:

dividing the phase array into m identical subarrays of n elements, m and n being integers obtained in the second selecting step, each of said antenna elements being electrically connected by a phase shifter to a functional element amplitude weight which produces an output signal by adjusting amplitudes of signals from its respective phase shifter;

assigning the values for the set of actual element amplitude weights $a'_{(mn)}$ obtained in said second calculating step to the functional element amplitude weight in the subarrays such that groups of identical subarrays of n elements have identical functional element amplitude weights between the nth corresponding elements, indicating a presence of m subarray ports, m subarray weights and m subarray time delays, each of said m subarray ports producing an output signal be receiving and summing signals from all functional element amplitude weights contained in its respective subarray, each of m subarray weights having assigned a value obtained in said third selecting step, each of said subarray weights producing an output signal by amplitude weighting signals received its respective subarray port, each of said subarray time delays producing an output signal by delaying signals received from its repective subarray amplitude weight, and noting the presence of the array output port which produces an output signal by recieving and summing all signals obtained from each of said subarray time delays.

3. A process, as defined in claim 2, including third calculating step in which a far field antenna pattern resulting from the effective amplitude taper of the set of subarray amplitude weights ($b_m$) and the actual amplitude weights $a'_{(mn)}$ is calculated, said third calculating step being performed after said second calculating step.

4. A process as defined in claim 3, including:

an evaluation step in which a comparison is made between the far field antenna pattern from said third calculating step, and the far field antenna pattern of said first calculating step, said evaluation step being performed after said third calculating step and indicating that said antenna design completion step should be accomplished when both of said far field antenna patterns favorably compare with satisfactory sidelobes; and a redesign step which entails repeating, in order, the second and third selecting steps, the second calculating step, and the evaluation step when both of the far field antenna patterns do not favorably compare in said evaluation step, and when said second selecting step is repeated, the redesign step includes increasing the number of subarrays selected (m) while decreasing the number of elements per subarray (n) while maintaining a product relationship (m)W×(n)=N, said redesign step being repeated until a favorable comparison between far field antenna patterns occurs in said evaluation step.

5. A process, as defined in claim 4, wherein said first selecting step comprises a selection of a distribution for said ideal exact element amplitude weights from a group of distributions including: Taylor, Chebychev, triangular and cosine distributions.

6. In combination with a phased array antenna containing a plurality of antenna elements which may be divided up into groups called subarrays, with each subarray producing an output signal which receives a subarray amplitude tapering before being summed into an array output signal, a process of reducing grating lobes in a far field antenna pattern of said phased array antenna, said grating lobes being caused by said subarray amplitude tapering, said process comprising the steps of:

a first selecting step in which an ideal exact element amplitude taper for all the individual elements in the phased array antenna is selected, said ideal exact element amplitude taper being a distribution of amplitude weights which, if distributed over the plurality of antenna elements, would result in an ideal far field antenna pattern with low sidelobes;

a first calculating step in which the ideal far field antenna pattern resulting from use of said ideal exact element amplitude taper is calculated;

a second selecting step in which the number of subarrays m, each containing n elements, is selected such that the product of (m)×(n) equals N, and N equals the total number of antenna elements in the phased array antenna, said signal selecting step including an indication of groups of identical subarrays such that all identical subarrays within a group are designed to apply identical element amplitude weights for corresponding elements in the subarrays in their respective groups;

a third selecting step in which a set of subarray amplitude weights ($b_m$) is selected for each of said m subarrays and a set of individual element weights ($a_{mn}$) is selected for each of the N antenna elements in the phased array antenna such that the produce of ($b_m$)×($a_{mn}$) approximately equals $A_{(mn)}$ where $A_{(mn)}$ equals the value of the ideal exact element amplitude taper for each of the individual antenna elements selected in the first selecting step;

a second calculating step, in which a calculation is made for a value for a set of actual element amplitude weights, such that each nth actual element amplitude weight is identical for corresponding elements in an identical subarray and is given by a set $a'_{(mn)}$ where each nth element amplitude weight in the set $a'_{(mn)}$ is obtained by averaging the value of each corresponding nth element amplitude of said set of individual element weights $a_{(mn)}$ selected in said third selecting step; and a third calculating step in which a far field antenna pattern resulting from the effective amplitude taper of the set of subarray amplitude weights ($b_m$) and the actual amplitude weights $a'_{(mn)}$ is calculated;

an evaluation step in which a comparison is made between the far field antenna pattern from said third calculating step, and the far field antenna pattern of said first calculating step, said evaluation step indicating that an antenna design completion step should be accomplished when both of said far field antenna patterns favorably compare with satisfactory sidelobes;

a redesign step which entails repeating, in order, the second and third selecting steps, the second and third calculating steps, and the evaluation step, when both of the far field antenna patterns do not favorably compare in said evaluation step, and when said second selecting step is repeated said redesign step includes identifying one additional group of identical subarrays within the phased array antenna rather than have all the subarrays being identical, so that the phased array antenna is composed of groups of identical subarrays with each subarray being identical with the others in its group, said redesign step being repeated until a favorable comparison between far field antenna patterns occurs in said evaluation step; and an antenna design completion step which adjusts said phased array antenna's design to include the set of subarray amplitude weights ($b_m$) and actual element amplitude weights $a'_{(mn)}$ obtained in said second calculating step to produce a configuration that reduces the grating lobes in the far field antenna pattern caused by the subarray amplitude tapering while simplifying said phased array antenna's design by containing groups of identical subarrays.

7. A process, as defined in claim 6, in which the antenna design completion step comprises the following substeps:

dividing the phased array into m identical subarrays of n elements, m and n being integers obtained in the second selecting step, each of said antenna elements being electrically connected by a phase shifter to a functional element amplitude weight which produces an output signal by adjusting amplitudes of signals to and from its respective antenna element;

assigning the values for the set of actual element amplitude weights $a'_{(mn)}$ obtained in said second calculating step to the functional element amplitude weights in the subarrays such that groups of identical subarrays of n elements have identical functional element amplitude weights between the nth corresponding elements;

indicating a presence of m subarray ports, m subarray weights and m subarray time delays, each of said m subarray ports producing an output signal by receiving and summing signals from all functional element amplitude weights contained in its respective subarray, each of m subarray weights having assigned a value obtained in said third selecting step, each of said subarray weights producing an output signal by amplitude weighting signals received its respective subarray port, each of said subarray time delays producing an output signal by delaying signals received from its respective subarray amplitude weight; and noting the presence of the array output port which produces an output signal by receiving and summing all signals obtained from each of said subarray time delays.

8. A process, as defined in claim 7, wherein said first selecting step comprises a selection of a distribution for said ideal exact element amplitude weights from a group of distributions including: Taylor, Chebychev, triangular and cosine distributions.

9. A phased array antenna system comprising:

groups of identical subarrays, each receiving subarray amplitude tapering, and each containing n antenna elements, where n is an integer, said groups of identical subarrays reducing grating lobes occuring in its far field antenna pattern due to said subarray amplitude tapering by providing a set of actual element amplitude weights to each of said n antenna elements such that each actual element amplitude weight for its nth antenna element is identical for each corresponding nth element for all subarrays within a designated group of identical subarrays; each of said subarrays producing an output signal by receiving and summing all signals produced each actual element amplitude weight contained the subarray;

a plurality of subarray weights, each producing an ouput signal by providing said subarray amplitude tapering to signals to and from one of said subarrays;

a plurality of subarray delays, each producing an output signal by delaying signals to and from one of said subarray weights; and an array port which outputs a signal by receiving and summing signals from said plurality of subarray delays.

10. A phased array antenna system, as defined in claim 9, wherein each identical subarray in a designated group comprises:

a set of n antenna elements each producing an output signal;

a plurality of phase shifters each adjusting the phase of signals to and from one of the antenna elements;

a set of actual element amplitude weights $a'_{(mn)}$ where m is an integer which identifies the subarray, and n is an integer identifying the antenna element within the subarray, such that each actual element amplitude weight produces an output signal by applying an amplitude weight in the amount of $a'_{(mn)}$ to signals to and from its respective phase shifter and antenna element, where the value of each $a'_{(mn)}$ is obtained by taking an arithmetic average of values of nth effective antenna element amplitude $(a_{mn})$ within each identical subarray in a designated group, where $A'_{(mn)}$ is determined by the equation:

$$(a_{mn})\times(b_m)=A_{(mn)}$$

where $(b_m)$ equals a value selected for the subarray weight applied to the nth subarray, and $A_{(mn)}$ equals a set of values for ideal exact element amplitude weighting which, if applied to the nth antenna element in the mth subarray, would produce an ideal far field antenna pattern with low sidelobes; and a subarray port which produces an output signal for each subarray by receiving and summing all signals received from the set of actual element amplitude weights within the subarray, said subarray port sending its output signal to its respective subarray weight for subarray amplitude tapering.

11. A phased array antenna system, as defined in claim 10, wherein said set of values for the ideal exact element amplitude weighting $A_{(mn)}$ comprises:

a distribution of amplitude weights derived from a group of distributors including: Taylor, Chebychev, triangular, and cosine distributions.

* * * * *